United States Patent
Beri et al.

(10) Patent No.: US 12,353,013 B2
(45) Date of Patent: *Jul. 8, 2025

(54) LIGHT WEIGHT FIBER OPTIC SPLICE AND FIBER MANAGEMENT SYSTEM

(71) Applicant: COMMSCOPE CONNECTIVITY BELGIUM BVBA, Kessel-Lo (BE)

(72) Inventors: Stefano Beri, Zaventem (BE); Danny Willy August Verheyden, Gelrode (BE); Jan Watté, Grimbergen (BE); Roel Modest Willy Bryon, Aarschot (BE); Kristof Vastmans, Boutersem (BE); Johan Geens, Bunsbeek (BE)

(73) Assignee: COMMSCOPE CONNECTIVITY BELGIUM BVBA, Kessel-Lo (BE)

( * ) Notice: Subject to any disclaimer, the term of this patent is extended or adjusted under 35 U.S.C. 154(b) by 0 days.

This patent is subject to a terminal disclaimer.

(21) Appl. No.: 18/609,538

(22) Filed: Mar. 19, 2024

(65) Prior Publication Data

US 2024/0345323 A1 Oct. 17, 2024

Related U.S. Application Data

(63) Continuation of application No. 18/046,331, filed on Oct. 13, 2022, now Pat. No. 11,966,080, which is a
(Continued)

(51) Int. Cl.
| | |
|---|---|
| *G02B 6/255* | (2006.01) |
| *G02B 6/38* | (2006.01) |
| *G02B 6/44* | (2006.01) |

(52) U.S. Cl.
CPC ......... *G02B 6/2558* (2013.01); *G02B 6/2556* (2013.01); *G02B 6/3801* (2013.01); *G02B 6/4454* (2013.01)

(58) Field of Classification Search
CPC .. G02B 6/2558; G02B 6/2556; G02B 6/4454; G02B 6/3846; G02B 6/3801
See application file for complete search history.

(56) References Cited

U.S. PATENT DOCUMENTS

| | | |
|---|---|---|
| 4,183,737 A | 1/1980 | Chown |
| 4,647,150 A | 3/1987 | DeSanti et al. |
| | (Continued) | |

FOREIGN PATENT DOCUMENTS

| | | |
|---|---|---|
| CN | 101517446 | 8/2009 |
| CN | 101681003 | 3/2010 |
| | (Continued) | |

OTHER PUBLICATIONS

Australian 2nd Exam Report in Application 2017315132, mailed Aug. 3, 2022, 4 pages.
(Continued)

*Primary Examiner* — Ryan A Lepisto
*Assistant Examiner* — Erin D Chiem
(74) *Attorney, Agent, or Firm* — Merchant & Gould P.C.

(57) ABSTRACT

The present disclosure relates to an optical splice package for splicing together first and second optical fibers or first and second sets of optical fibers. The optical fibers have elastic bending characteristics. The splice package includes a splice housing including a mechanical alignment feature for co-axially aligning ends of the first and second optical fibers or sets of optical fibers within the splice housing. The splice housing contains adhesive for securing the ends of the first and second optical fibers or sets of optical fibers within the splice housing. The optical package has a weight less than a spring force corresponding to the elastic bending characteristics of the first and second optical fibers or sets of optical fibers.

14 Claims, 31 Drawing Sheets

Related U.S. Application Data continuation of application No. 16/328,474, filed as application No. PCT/EP2017/071330 on Aug. 24, 2017, now Pat. No. 11,474,295.

(60) Provisional application No. 62/489,861, filed on Apr. 25, 2017, provisional application No. 62/468,468, filed on Mar. 8, 2017, provisional application No. 62/429,221, filed on Dec. 2, 2016, provisional application No. 62/380,080, filed on Aug. 26, 2016.

(56) References Cited

U.S. PATENT DOCUMENTS

| | | | |
|---|---|---|---|
| 5,090,792 A | | 2/1992 | Koht et al. |
| 5,151,964 A | * | 9/1992 | Carpenter .............. G02B 6/3839 385/71 |
| 5,183,489 A | * | 2/1993 | Brehm .................. C03B 23/037 385/98 |
| 6,266,472 B1 | * | 7/2001 | Norwood .............. G02B 6/3652 385/137 |
| 11,474,295 B2 | * | 10/2022 | Beri ...................... G02B 6/2558 |
| 11,966,080 B2 | | 4/2024 | Beri et al. |
| 2005/0207712 A1 | * | 9/2005 | Saito .................... G02B 6/3803 385/95 |
| 2010/0183265 A1 | | 7/2010 | Barnes et al. |
| 2010/0183274 A1 | * | 7/2010 | Brunet ................. G02B 6/4452 385/135 |
| 2010/0232752 A1 | * | 9/2010 | Labraymi .......... G02B 6/44515 385/99 |
| 2012/0237172 A1 | * | 9/2012 | Chen .................... G02B 6/3801 385/95 |
| 2013/0251317 A1 | * | 9/2013 | Faulkner ................ G02B 6/255 385/96 |
| 2015/0131950 A1 | * | 5/2015 | Ducra .................. G02B 6/2558 385/96 |
| 2015/0293313 A1 | | 10/2015 | Ott et al. |
| 2021/0278594 A1 | | 9/2021 | Beri et al. |

FOREIGN PATENT DOCUMENTS

| | | |
|---|---|---|
| CN | 204964844 U | 1/2016 |
| EP | 1012648 B1 | 12/2008 |
| TW | 373088 | 11/1999 |
| WO | 2013/117598 | 8/2013 |
| WO | 2014/118224 | 8/2014 |
| WO | 2015/134891 | 9/2015 |
| WO | 2016/043922 | 3/2016 |

OTHER PUBLICATIONS

Examination Report No. 1 for Australian Patent Application No. 2017315132 dated Sep. 6, 2021, 3 pages.

Chinese 1st Office Action and Search Report in Application 201780050615, mailed Mar. 13, 2020, 8 pages.

Chinese 2nd Office Action in Application 201780050615, mailed Nov. 12, 2020, 4 pages.

European Examination Report issued Mar. 9, 2022 in EP Patent Application No. 17 761 057.3-1001.

European Intention to Draft in Application 17761057.3, mailed Feb. 15, 2023, 6 pages.

Indian Exam Report in Application 201917005411, mailed May 23, 2021, 7 pages.

Indian Oral Hearing Notice in Application 201917005411, mailed Mar. 29, 2022, 4 pages.

Mexican 1st Office Action in Application MX/A/2019/000997, mailed Nov. 7, 2022, 3 pages.

Mexican 2nd Office Action in Application MX/A/2019/000997, mailed Mar. 16, 2023, 5 pages.

PCT International Preliminary Report on Patentability in Application PCT/EP2017/071330, mailed Mar. 7, 2019, 7 pages.

International Search Report and Written Opinion of the International Searching Authority for International Patent Application No. PCT/EP2017/071330 mailed Nov. 28, 2017, 12 pages.

* cited by examiner

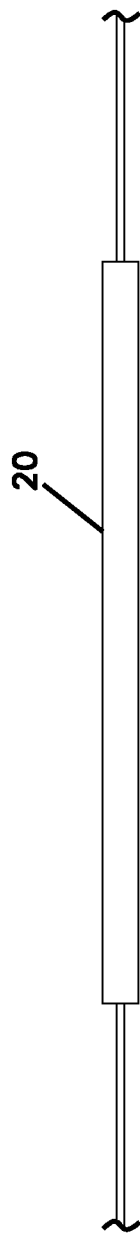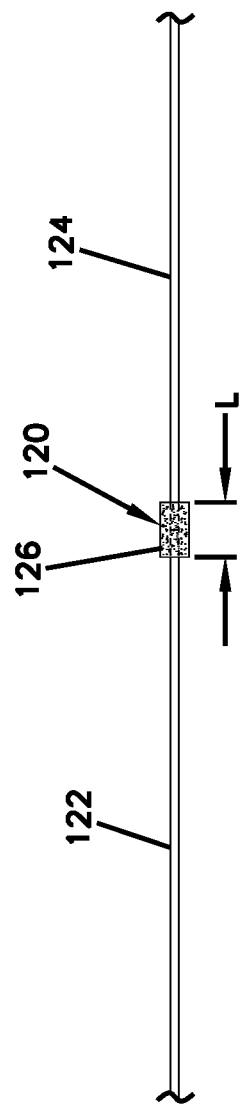
FIG. 1
(PRIOR ART)
FIG. 4

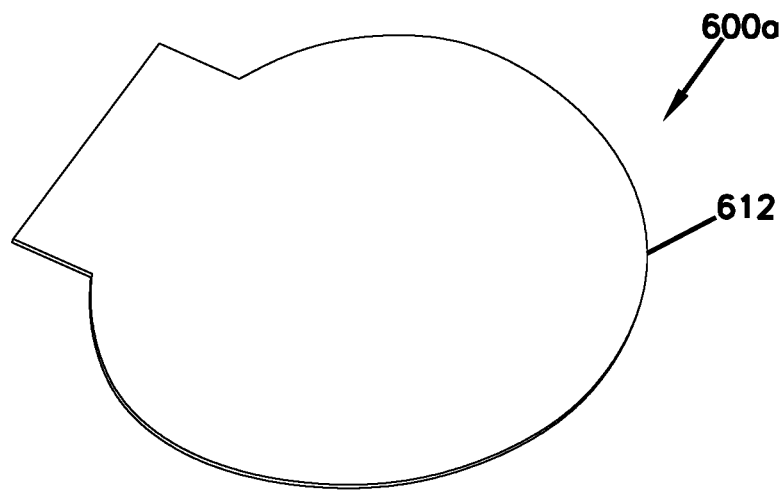
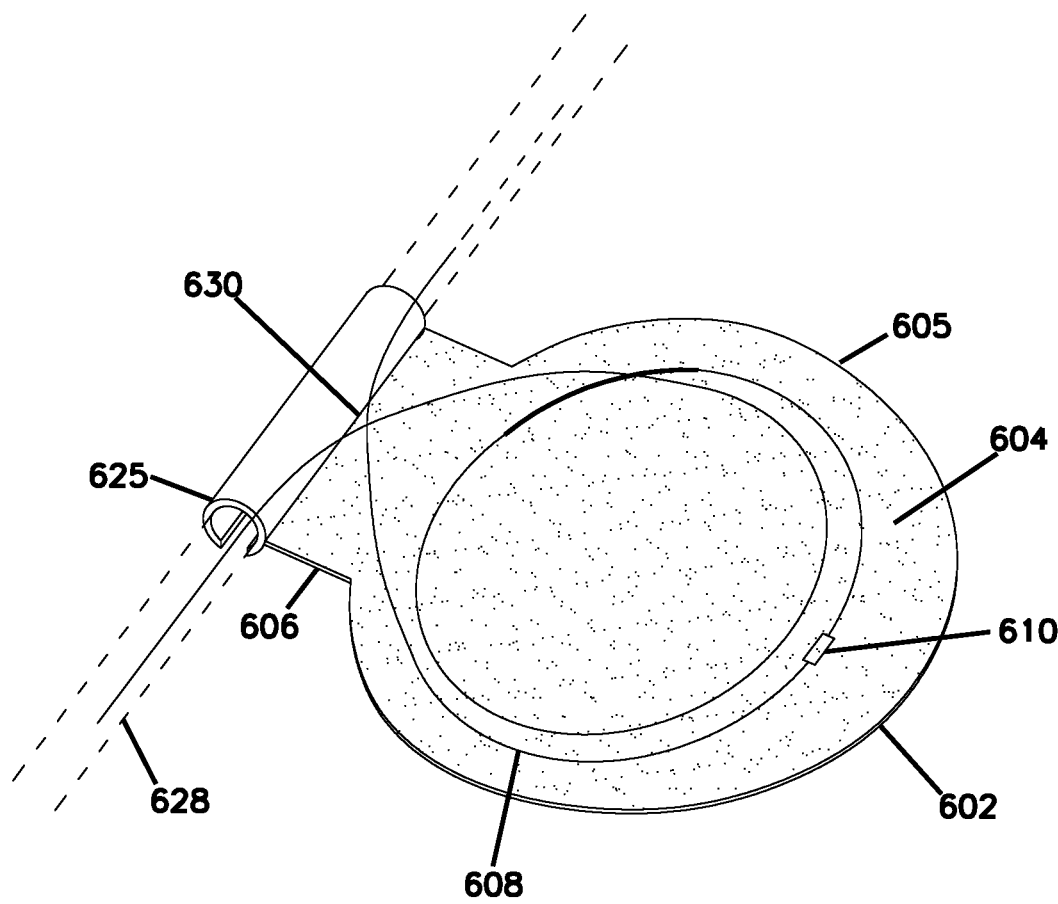
FIG. 29

LIGHT WEIGHT FIBER OPTIC SPLICE AND FIBER MANAGEMENT SYSTEM

CROSS-REFERENCE TO RELATED APPLICATIONS

This application is a continuation of U.S. patent application Ser. No. 18/046,331, filed Oct. 13, 2022, now U.S. Pat. No. 11,966,080, which is a continuation of U.S. patent application Ser. No. 16/328,474, filed on Feb. 26, 2019, now U.S. Pat. No. 11,474,295, which is a National Stage Application of PCT/EP2017/071330, filed on Aug. 24, 2017, which claims the benefit of U.S. Patent Application Ser. No. 62/380,080, filed on Aug. 26, 2016, and claims the benefit of U.S. Patent Application Ser. No. 62/429,221, filed on Dec. 2, 2016, and claims the benefit of U.S. Patent Application Ser. No. 62/468,468, filed on Mar. 8, 2017, and claims the benefit of U.S. Patent Application Ser. No. 62/489,861, filed on Apr. 25, 2017, the disclosures of which are incorporated herein by reference in their entireties.

TECHNICAL FIELD

The present disclosure relates generally to fiber optic networks and components. More particularly, the present disclosure relates to fiber optic networks and components having optical splices.

BACKGROUND

Fiber optic communication systems are becoming prevalent in part because service providers want to deliver high bandwidth communication capabilities (e.g., data and voice) to customers. Fiber optic communication systems employ a network of fiber optic cables to transmit large volumes of data and voice signals over relatively long distances. Optical fiber splices are an important part of most fiber optic communication systems. Optical fiber splices are typically used to provide a permanent or near permanent optical connection between optical fibers. Optical splices can include single fiber splices and multi-fiber splices (e.g., mass fusion splices). In a common splicing operation, two optical fibers or two sets of optical fibers are first co-axially aligned. Often opto-electronic equipment is used to provide active alignment of the cores of the optical fibers. Once the optical fibers have been aligned, the ends of the optical fibers can be fusion spliced together usually by an electric arc. After splicing, the splice location is typically reinforced with a fiber optic fusion splice protector. A common type of fiber optic fusion splice protector is a SMOUV fiber optic fusion splice protector sold by CommScope Inc. of Hickory, North Carolina, USA. This type of fusion splice protector includes an outer shrink-fit tube, a low temperature hot melt adhesive and a stainless steel or ceramic rod which functions to add rigidity to the protector and to reinforce the splice location.

Traditional fusion splice protectors are relatively long, bulky and heavy. FIG. 1 shows an example traditional fusion splice protector 20. By way of example, traditional fusion splice protectors are equal to or greater than 20 millimeters in length (most typically 30-61 mm in length) and are significantly heavier than the weight which is capable of being supported by the inherent elasticity of the optical fibers being optically spliced. Because of the size and bulk of typical fusion splice protectors, such protectors interfere with the ability of the optical fibers being spliced to bend along a natural curvature. If unsupported (i.e., if not fixated), such fusion splice protectors will apply undesirable loading to the spliced optical fibers when subject to vibrations or accelerations. Consequently, in managing splices, the splice protectors are managed separately from the fiber itself. For example, as shown at FIG. 2, splice trays are provided with first regions 22 (i.e., splice management regions) dedicated for securing (e.g., anchoring, fixating, etc.) and managing splice protectors, and second regions 24 (i.e., fiber management regions) for managing the optical fibers. The use of two separate regions increases the size of the splice trays, reduces the number of splices that can be stored per unit area of a given splice tray, and increases the complexity of the required fiber routing on the splice trays. For example, with a splice protector secured to a splice tray, two lengths of optical fiber must be separately managed and stored (e.g., one fiber length corresponding to each end of the splice protector). As shown at FIG. 3, a first length of optical fiber 26 extending from one end of a fixated splice protector 28 is routed in a first loop 29 on a splice tray 30 and a second length of optical fiber 32 extending from an opposite end of the splice protector 28 is routed in a second loop 31 on the splice tray 30. The first length of optical fiber 26 is typically anchored at two separate locations which include a first location 26a where the first length of optical fiber first enters the tray 30 and a second location 26b where the first length of optical fiber enters the splice management region 22. Similarly, second length of optical fiber 28 is typically anchored at two separate locations which include a first location 32a where the second length of optical fiber first enters the tray 30 and a second location 32b where the second length of optical fiber enters the splice management region 22.

SUMMARY

Aspects of the present disclosure relate to light weight fiber optic splice configurations that do not interfere in a meaningful way with the ability of the spliced optical fibers to elastically bend along a natural fiber curvature determined by the mechanical, physical and/or elastic properties of the optical fibers. In some examples, the light weight fiber optic splices include splices protected by light weight splice packages which provide mechanical fiber alignment. In some examples, the light weight fiber optic splices can be fusion splices protected by a re-coat process. In some examples, the light weight fiber optic splices include splices protected by light weight splice packages which include plastic splice housings having mechanical fiber alignment features and which use adhesive for securing the optical fibers within the splice housings.

Aspects of the present disclosure relate to mechanical alignment packages that include a housing and one or more internal fiber alignment structures within the housing that provide for mechanical alignment of opposing ends of first and second optical fibers, or opposing ends of first and second sets of optical fibers.

Optionally, housings of the present disclosure can contain multiple different types of different coupling mediums for providing different coupling functions within the housing. For example, a first coupling medium (e.g., a thixotropic index matching gel) can be provided on the optical path between the optical fiber ends to provide optical coupling between the optical fibers and a second coupling medium (an adhesive with no optical properties required) can be used along the optical fibers to mechanically fixate/couple the optical fibers to the housing. Thus, among these examples include those in which first and second optical fibers have ends that are co-axially aligned within the housing by an internal fiber alignment structure, there is an index matching gel (e.g., a thixotropic index matching gel) between opposing ends of the first and second optical fibers, and there is adhesive within the housing on opposite sides of the gel for retaining the first and second optical fibers within the housing. In other examples, an adhesive having optical properties (e.g., an index matching adhesive) can be used to provide both mechanical and optical coupling functionality.

Aspects of the present disclosure relate to light weight single fiber splices and light weight multi-fiber splices.

Aspects of the present disclosure relate to a light weight fiber optic splice package having a weight that is less than a spring force corresponding to elastic bending characteristics of the optical fibers being spliced.

Aspects of the present disclosure relate to a light weight multi-fiber optic splice package having a weight that is less than a spring force corresponding to combined elastic bending characteristics of two sets of optical fibers being spliced.

Aspects of the present disclosure relate to a light weight multi-fiber splice package having a weight that is less than a spring force corresponding to combined elastic bending characteristics of at least one optical fiber of each of two sets of optical fibers being spliced.

Aspects of the present disclosure relate to a light weight multi-fiber splice package having a weight that is less than a spring force corresponding to combined elastic bending characteristics of at least two optical fibers of each of two sets of optical fibers being spliced.

Aspects of the present disclosure relate to a light weight multi-fiber splice package having a weight that is less than a spring force corresponding to combined elastic bending characteristics of at least two but fewer than all of the optical fibers of each of two sets of optical fibers being spliced.

Aspects of the present disclosure relate to a light weight fiber optic splice package having a weight that is less than a spring force generated by inherent elastic bending characteristics of the optical fibers being spliced when the optical fibers are bent along a curve defined by a minimum bend radius of the optical fibers.

Aspects of the present disclosure relate to a light weight multi-fiber optic splice package having a weight that is less than a spring force generated by combined inherent elastic bending characteristics of one or more spliced fibers of two sets of optical fibers being spliced when the sets of spliced optical fibers are bent along a curve defined by a minimum bend radius of the optical fibers. Aspects of the present disclosure relate to a light weight fiber optic splice package having a weight less than or equal to 25 milligrams, or less than or equal to 22 milligrams, or less than or equal to 20 milligrams, or less than or equal to 18 milligrams.

Aspects of the present disclosure relate to a fiber optic splice package that can be stored, positioned or otherwise located at a bend of a fiber loop.

Aspects of the present disclosure relate to a fiber optic splice package that can be stored, positioned or otherwise located at a fiber loop (e.g., a fiber slack storage loop or fiber slack management loop).

Aspects of the present disclosure relate to light weight fiber optic splice package having a length less than or equal to 10 millimeters, or less than or equal to 7.5 millimeters, or less than or equal to 6 millimeters, or less than or equal to 5 millimeters.

Aspects of the present disclosure relate to light weight fiber optic splice package having a length less than or equal to 10 millimeters, or less than or equal to 7.5 millimeters, or less than or equal to 6 millimeters, or less than or equal to 5 millimeters and having a weight less than or equal to 25 milligrams, or less than or equal to 22 milligrams, or less than or equal to 20 milligrams, or less than or equal to 18 milligrams.

Aspects of the present disclosure relate to an optical fiber splice package that is installed or stored in a free-floating condition or configuration (i.e., the splice package is not fixated to a tray or other structure).

Aspects of the present disclosure relate to an optical fiber splice package that is installed or stored at a splice tray, splitter module, WDM module or other structure in a free-floating condition or configuration.

Aspects of the present disclosure relate to an optical fiber splice package that is housed in a fiber optic connector in a free-floating condition or configuration.

Aspects of the present disclosure relate to fiber optic splice packages used for cold splicing applications (i.e., splices that do not include fusion splices).

Aspects of the present disclosure relate to fiber optic splice packages that use mechanical fiber alignment so as to not require the use of active alignment equipment to co-axially align the optical fibers being spliced.

Aspects of the present disclosure relate to a light weight splice package including a splice housing (e.g., a polymeric/plastic housing) including mechanical alignment features. In certain examples, the mechanical alignment features can include grooves defined by the splice housing itself, grooves defined by rods, spring structures for biasing fibers into grooves, elastic cantilevers that are unitary with the splice housing, spring biased balls, spring clips or other structures.

Aspects of the present disclosure relate to a light weight splice package including a splice housing (e.g., a polymeric/plastic housing) including mechanical alignment features and adhesive for securing the ends of optical fibers in the aligned position within the splice housing. In certain examples, the adhesive can include epoxy, light curable adhesive (e.g., ultraviolet light curable adhesive), thermo-form adhesive, thermo-set adhesive, index-matching adhesive or other adhesives.

Aspects of the present disclosure relate to a splice tray or other fiber manager that does not include a dedicated or separate splice management region.

Aspects of the present disclosure relate to fiber management structures and systems for managing excess fiber length corresponding to fiber optic splices (e.g., light weight splices), wherein the structures and systems do not include dedicated or separate splice management areas, and wherein the fiber management structures have splice densities of at least one splice per 10 square centimeters of footprint area, or at least one splice per 8 square centimeters of footprint area, or at least one splice per 6 square centimeters of footprint area. In one example, the fiber management structure includes a tray.

Aspects of the present disclosure relate to flexible fiber management structures and systems for managing excess fiber length corresponding to fiber optic splices (e.g., light weight splices).

Aspects of the present disclosure relate to fiber management structures and systems for managing excess fiber length corresponding to fiber optic splices (e.g., light weight splices) where the length of optical fiber is stored in a circular loop defined by a bend radius or diameter of the stored optical fiber. In certain examples, the fiber optic splice is positioned along a curved section (e.g., an arc) of the optical fibers defined by the bend radius. In certain examples, the shape of the circular loop is defined and/or maintained by the inherent elasticity of the bent optical fibers. In certain examples, the bend radius is a minimum bend radius of the optical fiber or fibers.

Aspects of the present disclosure relate to a splice tray or other manager in which splices are positioned at random locations along fiber loops located within a slack loop storage location of the tray or other fiber manager. In certain examples, the tray or other fiber manager includes fiber guides, bend radius limiters, walls, spool structures or other fiber path-defining or retaining features for managing optical fibers in fiber loops without violating bend radius limitations of the optical fibers.

Aspects of the present disclosure relate to flexible fiber managers for managing optical fibers which may include spliced optical fibers, the fiber managers including flexible substrates and/or flexible substrates with adhesive layers for maintaining fiber routing paths and/or flexible substrates with adhesive layers and pealable cover layers and/or flexible substrates with integrated connection elements (e.g., clips, rods, snaps, members, extensions, enlargements, protrusions, etc.) and/or flexible substrates defining containment structures such as envelops, bags or sleeves.

Aspects of the present disclosure relate to a splice tray or other manager in which splices are positioned along fiber loops located within a slack loop storage location of the tray or other manager. In certain examples, the tray or other manager includes fiber guides, bend radius limiters, walls, spool structures or other fiber path-defining or retaining features for managing optical fibers in fiber loops without violating bend radius limitations of the optical fibers.

Aspects of the present disclosure relate to a splice tray or other fiber manager in which splices are positioned within a slack loop storage location of the tray or other fiber manager. In certain examples, the tray or other fiber manager includes fiber guides, bend radius limiters, walls, spool structures or other fiber path-defining or retaining features for managing optical fibers in fiber loops without violating bend radius limitations of the optical fibers.

Aspects of the present disclosure relate to a splice tray or other fiber manager in which splices are positioned along a bend of a fiber loop within a slack loop storage location of the tray or other fiber manager. In certain examples, the tray or other fiber manager includes fiber guides, bend radius limiters, walls, spool structures or other fiber path-defining or retaining features for managing optical fibers in fiber loops without violating bend radius limitations of the optical fibers.

Aspects of the present disclosure relate to managed splices (e.g., splices managed on a tray, substrate, manager, holder, etc.) that are fusion splices protected by a re-coat process.

Aspects of the present disclosure relate to managed splices (e.g., splices managed on a tray, substrate, manager, holder, etc.) that are fusion splices protected by a coating layer having a diameter that is less than or equal to 10 percent larger than a coating layer of the optical fibers being fusion spliced.

In certain examples, light weight splices and splice packages in accordance with the principles of the present disclosure are used for fiber optic splices within fiber optic connectors, fiber optic splices stored on splice trays, fiber optic splices used with fiber circuits, fiber optic splices used with flex-foils or flexible circuits or planar light circuits, fiber optic splices used to connect a fiber stub projecting to a ferrule to a cable fiber, multi-fiber splice applications, and fiber optic splices within passive optical splitter modules, wavelength division multi-plexer modules, patching modules, connector modules or other value added modules.

Aspects of the present disclosure relate to systems and methods for storing and/or managing optical fibers alone and/or optical fibers that are optically coupled together by lightweight optical splices. Storing optical fiber can be accomplished by rolling up the fiber (e.g., coiling the optical fiber) according to its own bend diameter. The coiling process can be automated (e.g., in a factory setting), or accomplished manually. In one example, the bend diameter can be a minimum allowed bend diameter for the optical fiber or larger.

Aspects of the present disclosure relate to products for managing optical fibers and/or optical fibers optically coupled together by fusion or mechanical splices.

By using light weight optical splices (e.g., re-coat protected splices or splices protected by light weight packages of the type disclosed herein), a splice holder or any other similar device can be eliminated from a fiber organizer/fiber manager. By using light weight splices there in no need to individually and separately store or fixate the splice locations, instead the installer only can coil the fiber over-length to its allowed bend diameter and store this away onto a medium (e.g., an organizer, manager, etc.) without coordinating/controlling the positioning of the splice location. When not separately storing a splice protector, the organizer becomes less complex, and in certain examples only a circular space can be used for storing optical fiber with the size of the circle being defined by the minimum bend diameter of the fiber itself or larger. In one example, the time for installation is reduced because the installer only has to route one loop where with prior art techniques two fibre lengths had to be looped and stored away. Certain aspects allow the capacity of management systems to be doubled or more than doubled. One reason for this is because splice holders can be eliminated and splice holders are typically the tallest component on a tray/organize and therefore define the minimum tray/organizer height. In certain examples, the thickness of each individual manager (e.g., substrate, fiber holder, tray, etc.) can be comparable to a coated optical fiber (e.g., less than or equal to 250 microns or less than or equal to 200 microns).

Aspects of the present disclosure relate to fiber and/or splice management system systems that include all flexible fiber management components and/or systems that include all rigid fiber management components and/or combined flexible and rigid fiber management components. In one example, one or more fiber managers having a first flexibility can be attached or mounted to a base component (e.g., a mount, support, etc.) having a second flexibility that is more rigid than the fiber managers. The fiber managers can include sleeves, substrates, envelopes, bags or other structures. The fiber managers can have a construction that is not self-supporting. The base components, panels, plates or other structures can have self-supporting constructions. The fiber managers can have inherent flexibilities that allow bodies of the fiber managers to flex in a hinge-like manner. The fiber managers can include attachment elements (e.g., fastening structures, clips, rods, snap-fit structures, holders, adhesive elements, extensions, guides, locking members, etc.) for attaching the fiber managers to cables, panels, plates, bases or other structures. In some examples, the attachment elements can be more rigid than main bodies of the fiber managers. The attachment elements can be co-molded with the main bodies of the fiber managers; co-extruded with the main bodies of the fiber managers; or otherwise attached (e.g., bonded, thermally bonded, adhesively bonded, mechanically attached, etc.) to the main bodies of the fiber managers.

Aspects of the present disclosure relate to flexible fiber managers that remain flexible in a final use state and are not supported on a rigid tray or other structure that supports main bodies of the flexible fiber managers to limit or restrain flexibility.

In certain examples, the flexible fiber managers in accordance with the principles of the present disclosure are stored or contained or protected within enclosures having flexible constructions. Because the fiber managers are flexible, the enclosure can be lighter weight and deformable since the fiber managers need not be protected against mechanical impacts or cracking (i.e., unlike rigid trays, the flexible managers can flex to absorb mechanical impacts without breaking). In certain examples, the enclosures can be configured to bend or flex in respond to mechanical impacts or pressure. In certain examples, the enclosures can expand and contract in response to variations in air pressure. In certain examples, the enclosures can include vents for allowing the enclosures to breathe. In certain examples, the vents can include expanded polytetrafluoroethylene.

Aspects of the present disclosure relate to fiber managers that include one or more of the following structures: bags, envelopes, flexible substrates, flexible substrates with adhesive for retaining optical fibers on fiber routing paths, pressure sensitive adhesive layers, pealable cover layers, layers having polymeric constructions, attachment structures, rollable structures, and substrates that are not self-supporting.

Aspects of the present disclosure relate to a fiber manager and/or substrate and/or organizer and/or fiber holder having a thickness less than or equal to 1000 microns, or 900 microns, or 800 microns, or 700 microns, or 600 microns, or 500 microns, or 400 microns, or 300 microns.

Aspects of the present disclosure relate to a fiber manager having a flexible construction that is not self-supporting (i.e., when held at one end the fiber manager visibly flexes under its own weight).

Aspects of the present disclosure relate to fiber managers having a flexibility comparable to flexibility of optical fiber.

Aspects of the present disclosure relate to a fiber manager (e.g., substrate) having a flexibility that flexes up to but not beyond a minimum bend radius of an optical fiber intended to be managed. In one example, the optical fiber is a G657A or G652D optical fiber. In one example, a plurality of different types of optical fibers are intended to be managed by the manager, and the minimum bend radius beyond which the manager does not flex corresponds to the minimum bend radius of the optical fiber having the highest minimum bend radius of the plurality of optical fibers (i.e., the manager can be designed for the worse-case scenario). Preferably, the manager does not break or kink to ensure the safety and protection of the optical fibers. In certain examples, the substrate is bendable in such a way that the optical fiber bend radius requirements are respected and satisfied.

In other examples, the fiber manager (e.g., substrate) may have a flexibility that allows the manager to flex along a bend smaller than a minimum bend radius of the optical fiber or fibers being managed.

Aspects of the present disclosure relate to fiber managers including flexible substrates and integrated attachment structures that are co-molded, co-extruded, or otherwise attached thereto (e.g., bonded, adhesively bonded, thermally bonded, etc.).

It will be appreciated that any of the above aspects and examples can be used individually or in any combination with any one or more of the other aspects and examples.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the examples disclosed herein are based.

BRIEF DESCRIPTION OF THE DRAWINGS

FIG. 1 illustrates a prior art fiber optic splice protector for protecting a fusion splice between two optical fibers;

FIG. 4 shows a splice package in accordance with the principles of the present disclosure for providing an optical splice between two optical fibers;

FIG. 29 is an exploded view of still another manager in accordance with the principles of the present disclosure for managing optical fibers and/or optical fiber splices;

DETAILED DESCRIPTION

Figure 2:
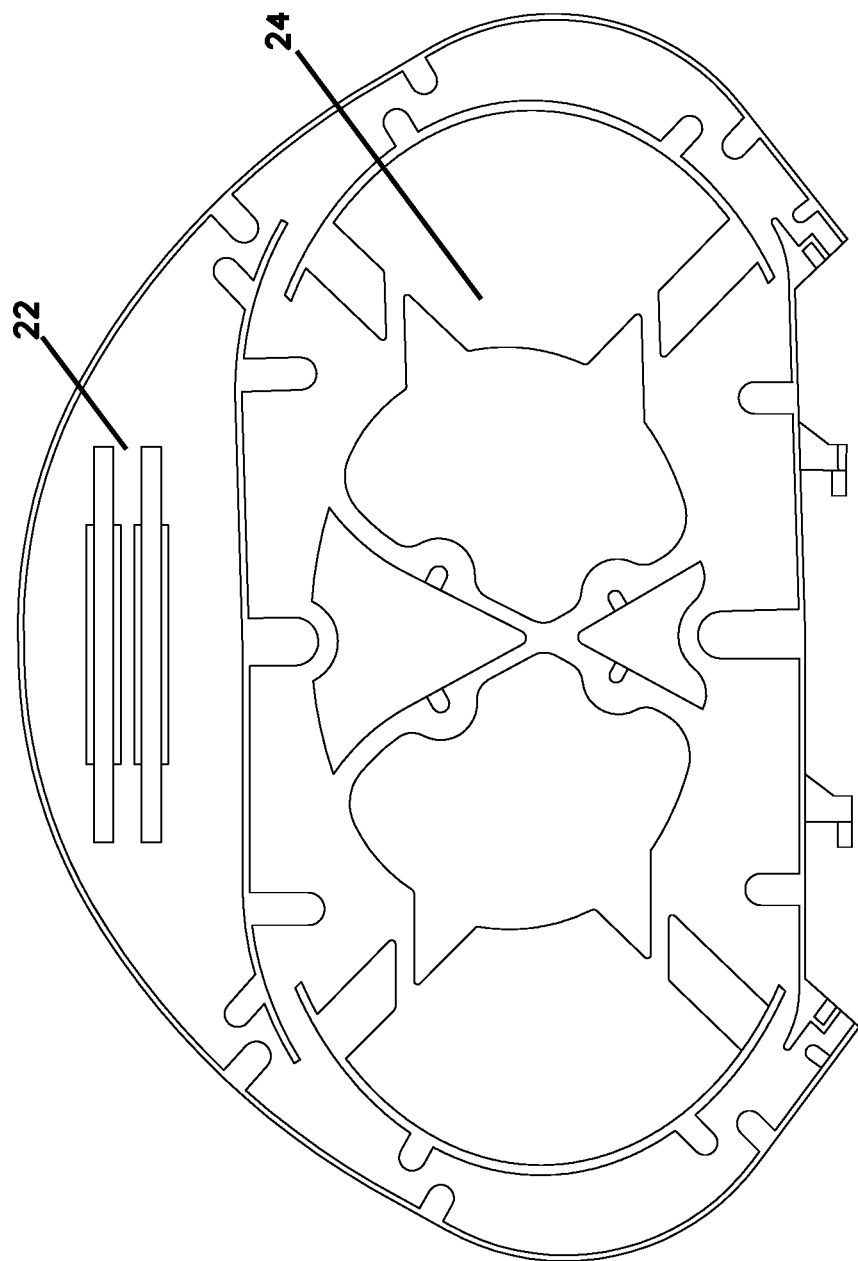
FIG. 2 illustrates a prior art splice tray having a first region for fixating fiber optic splice protectors and a second region for managing slack fiber in fiber storage loops.
Figure 3:
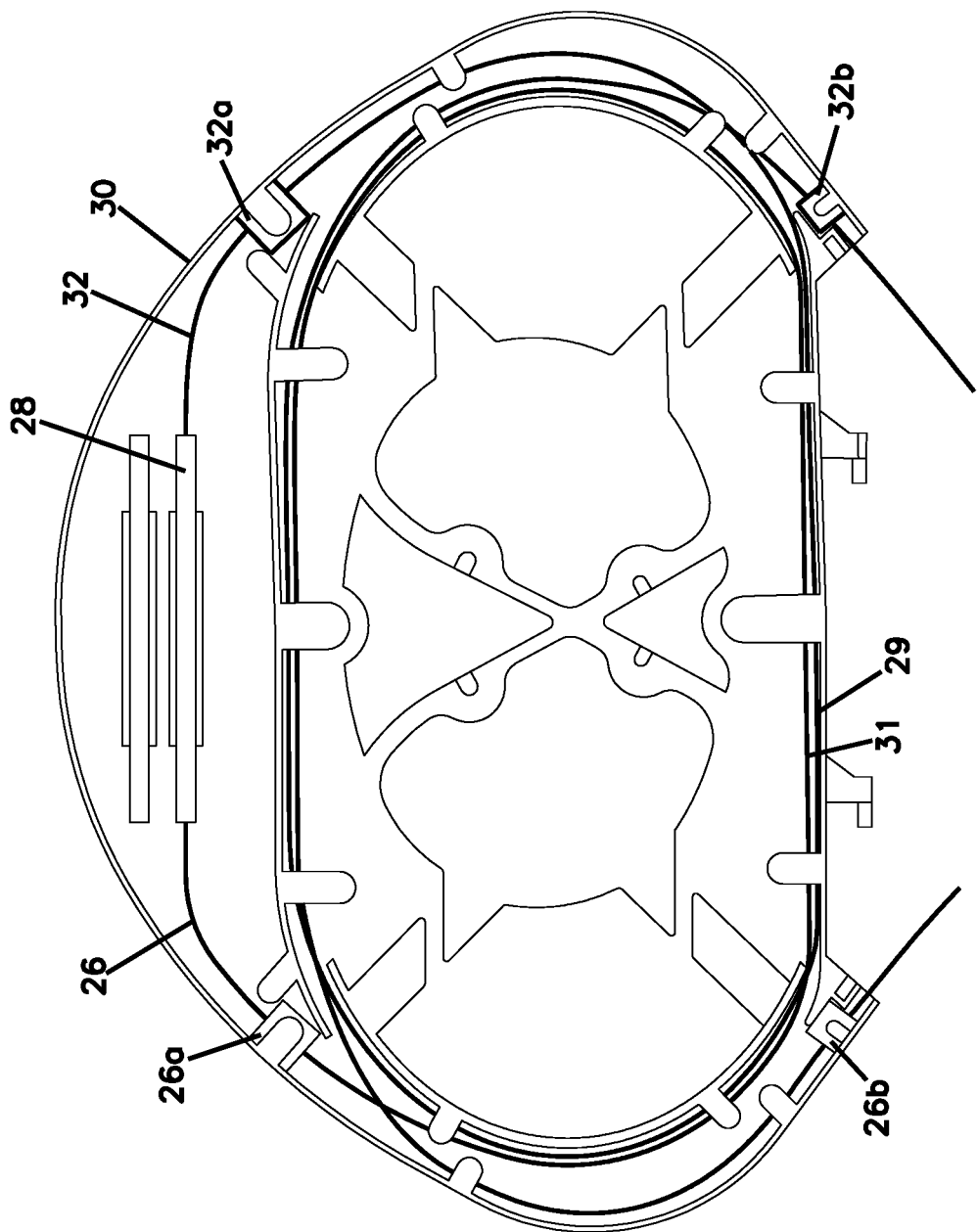
FIG. 3 illustrates an example prior art fiber routing scheme for routing optical fibers on the splice tray of FIG. 2.

Various examples will be described in detail with reference to the drawings, wherein like reference numerals represent like parts and assemblies throughout the several views. Any examples set forth in this disclosure are not intended to be limiting and merely set forth some of the many possible ways for implementing the broad inventive aspects disclosed herein.

Figure 5:
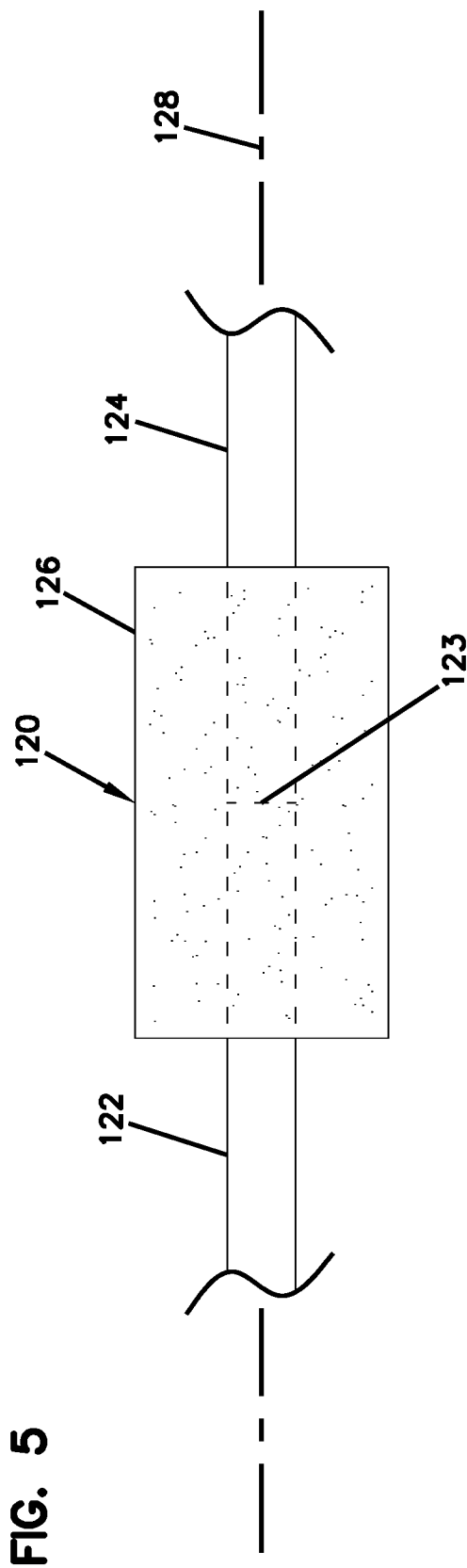
FIG. 5 is an enlarged view schematically showing a splice within the splice package of FIG. 4.

FIGS. 4 and 5 illustrate a splice package 120 in accordance with the principles of the present disclosure. The splice package 120 is adapted for forming and supporting an optical splice between a first optical fiber 122 and a second optical fiber 124. It should be appreciated that, throughout the figures, the splice package 120 can represent a single fiber to single fiber splice package or a multi-fiber to multi-fiber splice package; likewise, the first optical fiber 122 can represent a single fiber or a first set of a plurality of first optical fibers 122; and the second optical fiber 125 can represent a second fiber or a second set of a plurality of second optical fibers 124. In certain examples, the splice package 120 includes a splice housing 126 that either houses or includes features for mechanically co-axially aligning the ends of the first and second optical fibers 122, 124 along an axis 128. Examples of different mechanical alignment features are disclosed in embodiments of FIGS. 12-24 and 35-41. In certain examples, the splice housing 126 can contain an adhesive that fixes the ends of the first and second optical fibers 122, 124 within the splice housing 126. Example adhesives include epoxy, light curable adhesive (e.g., ultraviolet light curable adhesive), thermo-form adhesive, thermo-set adhesive, index-matching adhesive or other adhesives.) In further examples, the ends of the first and second optical fibers 122, 124 are co-axially aligned within the splice housing 126 by an internal fiber alignment structure (FIGS. 12-24 and 35-41), there is an index matching gel (e.g., a thixotropic index matching gel) between opposing ends of the first and second optical fibers 122, 124, and there is adhesive within the splice housing 126 on opposite sides of the gel for retaining the first and second optical fibers 122, 124 within the splice housing 126. FIG. 5 shows the ends of the optical fibers 122, 124 held in co-axial alignment within the splice package 120. Line 123 represents opposing end faces of the optical fibers 122, 124. Thus, in some examples, there can be index matching gel at least at the line 123 and adhesive on either side of the gel.

An important aspect of the splice package 120 is that the splice package 120 does not substantially alter normal bending of the optical fibers 122, 124. One reason the splice package 120 does not substantially alter normal bending of the optical fibers 122, 124 is that the splice package 120 is relatively short in length. One example, of the splice package 120 has a length less than or equal to 10 millimeters (mm). In another example, the length L of the splice package 120 is less than or equal to 7.5 mm. In still another example, the length L of the splice package 120 is less than or equal to 6 mm or less than or equal to 5 mm and/or the splice package has a weight less than or equal to 25 milligrams, or less than or equal to 22 milligrams, or less than or equal to 20 milligrams, or less than or equal to 18 milligrams.

Another reason the splice package 120 does not substantially affect the normal bending of the first and second optical fibers 122, 124 is that the splice package 120 is relatively light. Because the splice package 120 is relatively light, the weight of the splice package 120 does not cause meaningful deformation or bending of the optical fibers 122, 124. The light weight of the splice package 120 also inhibits substantial loading caused by vibrations or other accelerations from being applied to the optical fibers 122, 124. Thus, for certain applications, the splice package 120 can be installed or positioned in a free-floating configuration in which the splice package 120 is not fixated to another structure such as a connector housing or a splice tray. In certain examples, the weight of the splice package 120 is supported by the natural elastic characteristics of the optical fibers 122, 124.

In certain examples, the fiber optic splice package 120 has a weight that is less than a spring force corresponding to elastic bending characteristics of the optical fibers 122, 124. A test for determining whether the splice package 120 has a weight less than the elastic fiber bending force corresponding to the type of optical fibers intended to be spliced shown at FIGS. 6 and 7. According to this test, two lengths of test optical fibers 122a, 124b having the same elastic properties as the fibers 122, 124 are spliced at the splice package 120. The lengths of optical fiber 122a, 124b are engaged and supported at locations 130. The locations 130 can be located a spacing S from the closest end of the splice housing 126. For the purpose of testing, the spacing S can be 4 cm. After the locations 130 have been engaged, the locations 130 are forced together as indicated by arrows 132. As the locations 130 are forced together, the optical fibers lengths 122a, 124a elastically bend along a natural curvature. If the splice package 120 is lighter than the spring force corresponding to the elastic bending characteristics of the flexed optical fiber lengths 122a, 124b, the splice package 120 can be supported above the fiber engagement locations 130 and held suspended or floating by the spring force of the flexed optical fibers. This is shown at FIG. 7.

In other examples, the fiber optic splice package 120 has a weight that is less than a spring force generated by the inherent elastic bending characteristics of the spliced optical fibers when the optical spiced optical fibers are bent at their minimum bend radius.

Figure 8:
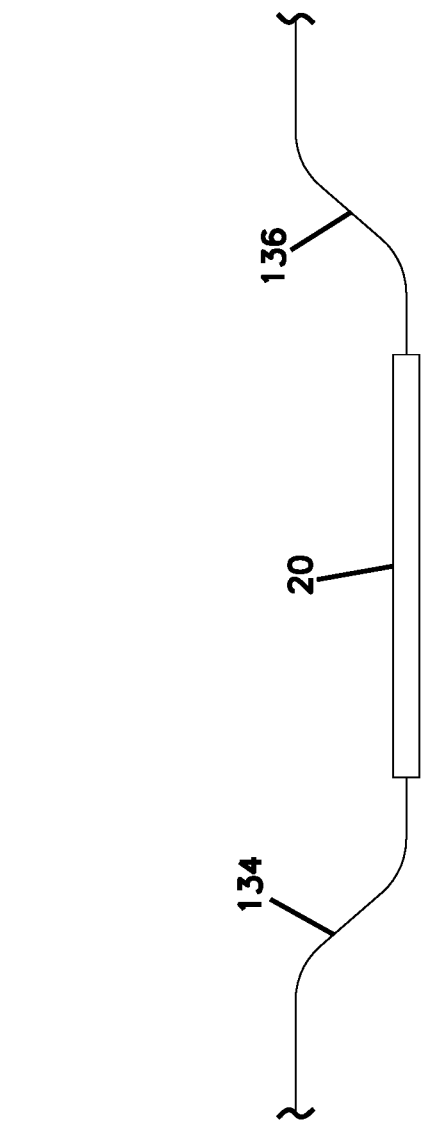
FIG. 8 shows a prior art fusion splice protector having a weight which is too heavy to be supported by the inherent spring characteristics of the optical fibers coupled to the splice protector.

FIG. 8 shows an example of a prior art fusion splice between optical fibers 134, 136. The fusion splice location is protected by a traditional fusion splice protector 20. The weight of the fusion splice protector 20 is greater than the inherent spring force associated with bending of the optical fibers 134, 136. Thus, the fusion splice protector 120 hangs below the fiber engagement locations 130 and cannot be elevated above the locations 130.

Figure 9:
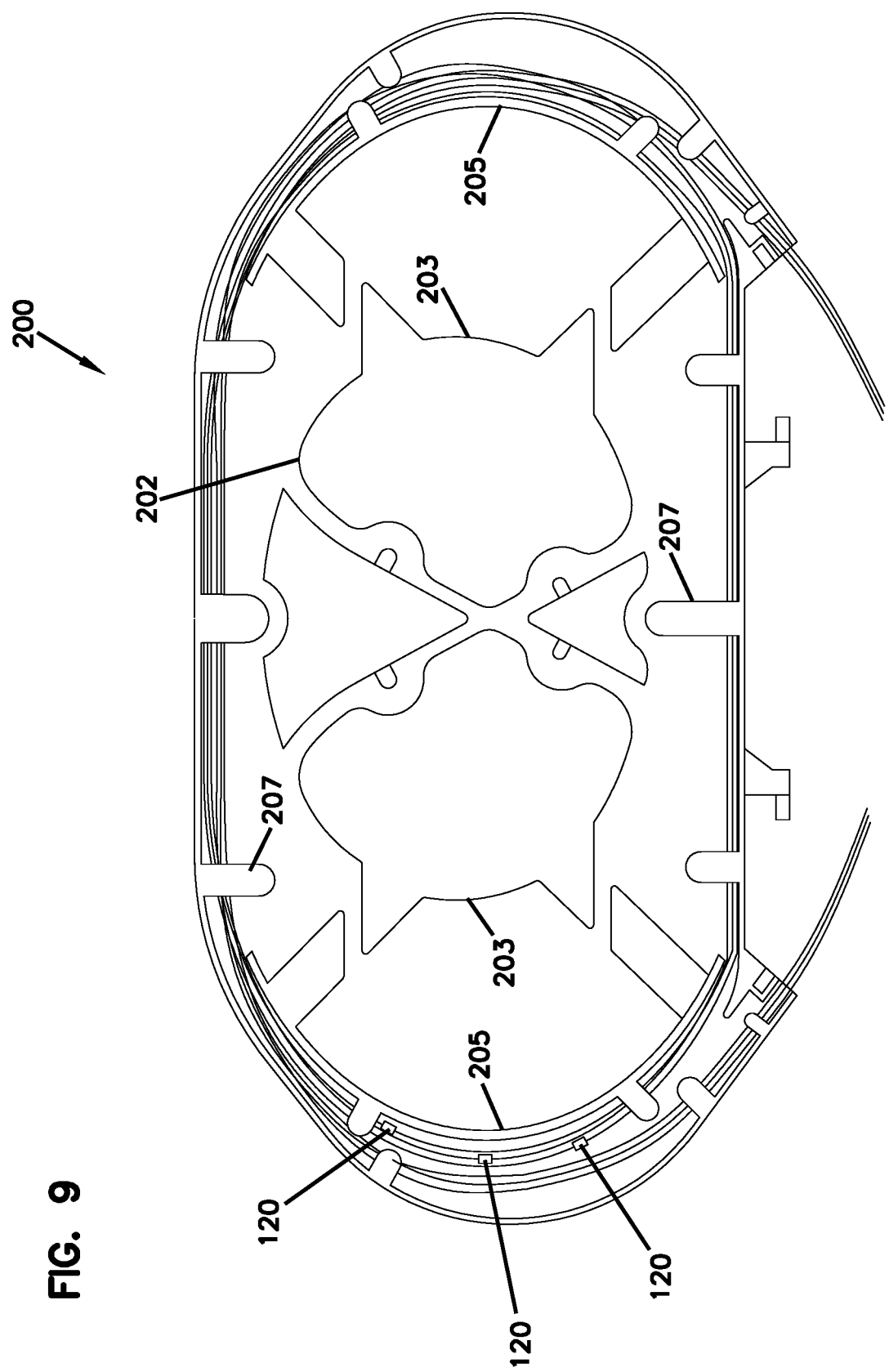
FIG. 9 shows a splice tray in accordance with the principles of the present disclosure.

FIG. 9 illustrates a splice tray 200 in accordance with principles of the present disclosure. The splice tray 200 does not include structure for fixating fiber optic splice protectors to the splice tray 200. Thus, the splice tray 200 does not have a dedicated region for fixating fiber optic splice protectors to the splice tray 200 and for managing fiber optic splice protectors. Instead, the entire surface area of the splice tray 200 is dedicated to managing optical fibers via optical fiber loops. It will be appreciated that the splice tray 200 can include a central spool-structure 202 including exterior curved bend-radius limiting structures 203 (i.e., bend radius protectors). The splice tray 200 can also include curved walls 205, curved paths, curved channels, race-track shaped paths, and other structures for supporting optical fibers along the loops without violating bend radium limitations of the optical fibers. In certain examples, tabs 207 can be provided for retaining the optical fibers on the tray 200. The tabs can overhang the optical fiber loops to retain the looped optical fibers on the tray.

As shown at FIG. 9, the splice packages 120 are randomly positioned on the splice tray 200. The splice packages 120 are positioned within the loop storage portion of the splice tray 200 where excess fiber length is looped and stored. The splice packages 120 are not fixed or anchored to the splice tray 200. Instead, the splice packages 120 are free-floating and are supported by the optical fibers themselves (although some contact may occur with the splice tray 200 as well). In certain examples, one or more of the splice packages 120 are positioned along a curved or bent portion of the fiber storage loop. By positioning the splice packages 120 within the fiber storage loop area without providing separate anchoring of the splice packages 120, the splice density of the splice tray 200 can be increased.

In other examples, the fiber storage loops can be arranged in circular loops with the splice packages positioned along the circular curvature. In certain examples, the fiber lengths including the splice packages can be looped and stored in a flexible fiber manager such as a flexible sleeve or envelop.

Figure 10:
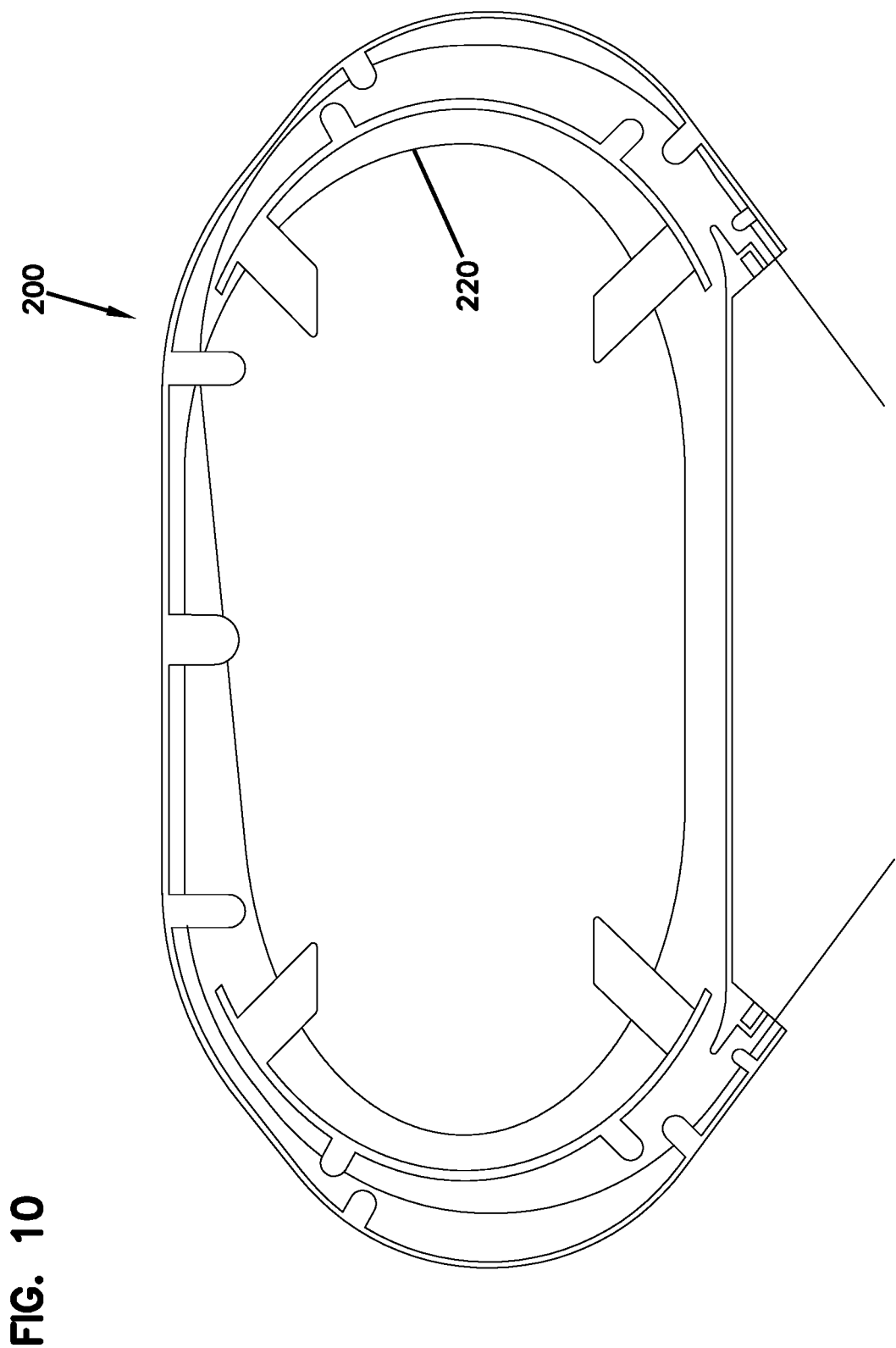
FIG. 10 shows another splice tray in accordance with the principles of the present disclosure.

FIG. 10 shows the splice tray 200 supporting a plurality of optical splices 220 (only one shown). The optical splices 220 can include fusion splices protected by a re-coat process. Similar to the example of FIG. 9, the splice locations can be randomly positioned on the tray and can be free-floating. In certain examples, the free-floating splices can be positioned at bends or curvatures of the fiber loops. In certain examples, the re-coat sections can have a diameter that is no more than 10% larger than the diameter of the normal coating of the optical fibers being spliced. In certain examples, the re-coat section can have an outer diameter that is equal to the outer diameter of the normal coating layers of the optical fibers.

Figure 11:
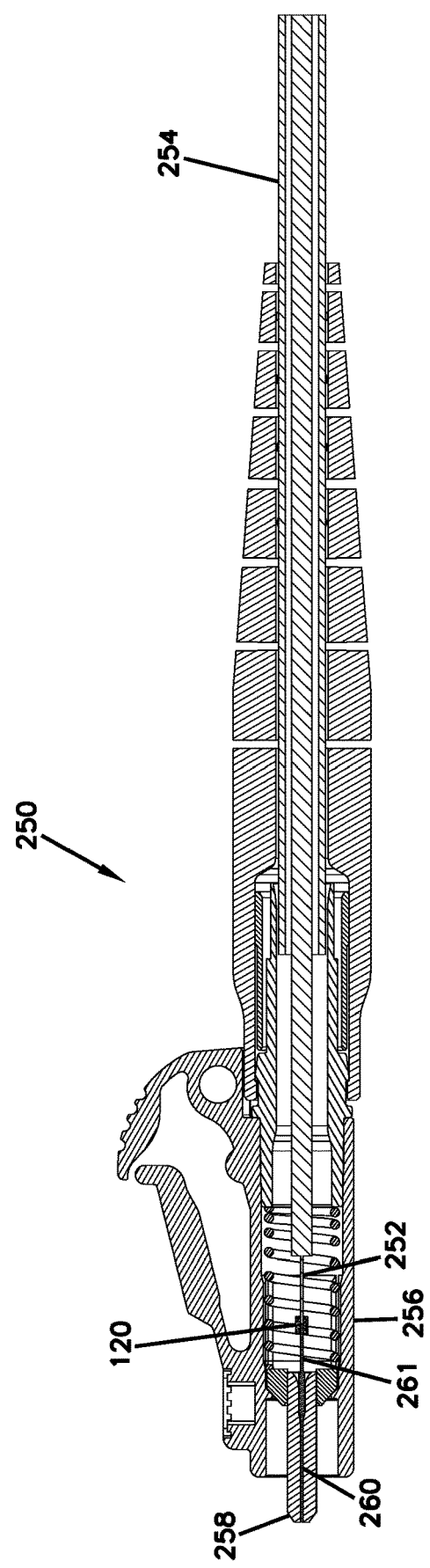
FIG. 11 shows a fiber optic connector having a connector housing in which a splice package in accordance with the principles of the present disclosure is located.

FIG. 11 shows a fiber optic connector 250 spliced to an optical fiber 252 of a fiber optic cable 254. The fiber optic connector 250 includes a connector housing 256. A ferrule 258 is mounted at a front end of the connector housing. The ferrule supports an optical fiber 260 having a stub-end 261 that projects rearwardly from the ferrule 258. The stub-end 261 of the optical fiber 260 is spliced to the optical fiber 252 of the cable 254. The splice location is protected by the splice package 120. The splice package 120 can be free-floating within the interior of the connector housing 256.

Figure 12:
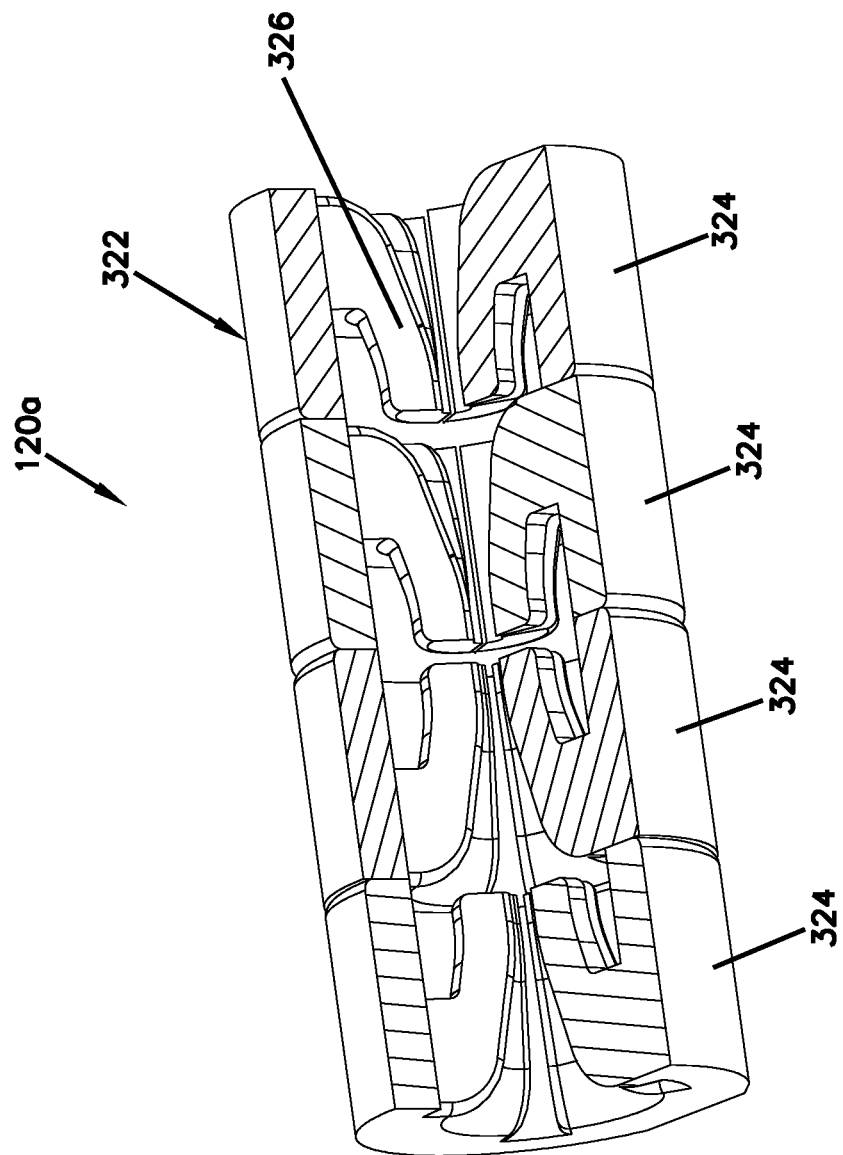
FIG. 12 is a cross-sectional view showing a splice package in accordance with the principles of the present disclosure including a splice housing having unitary flexible cantilevers for providing mechanical co-axial alignment of two optical fibers desired to be spliced together.
Figure 13:
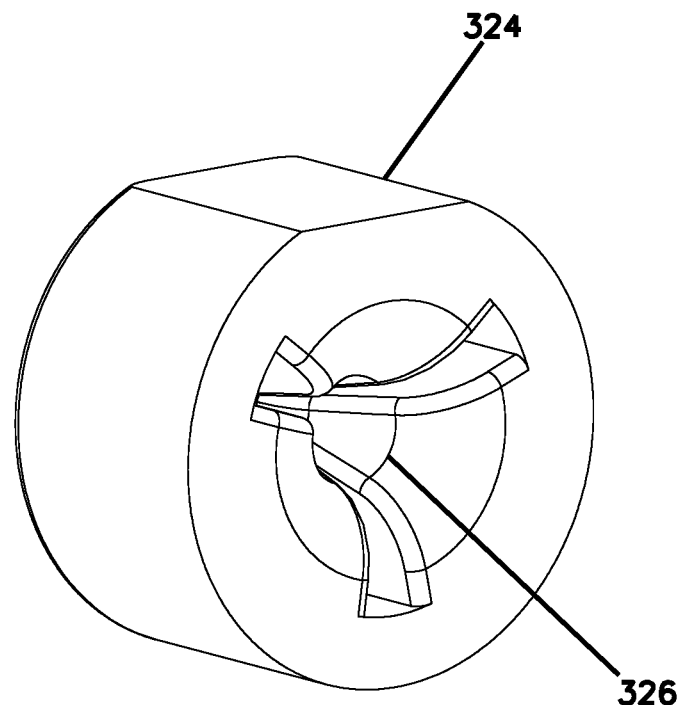
FIG. 13 shows one end of a segment of the splice housing of FIG. 12.
Figure 14:
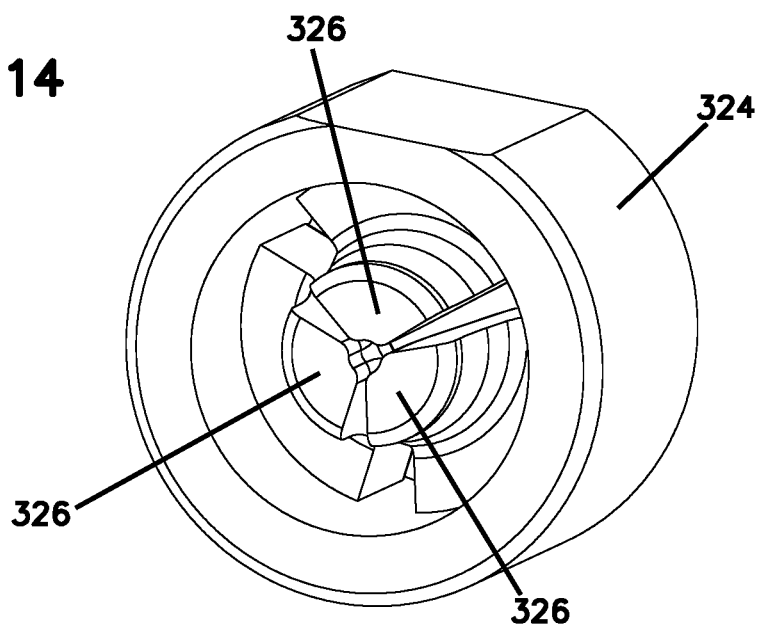
FIG. 14 shows an opposite end of the splice housing segment of FIG. 13.

FIGS. 12-14 illustrate an example splice package 120a in accordance with the principles of the present disclosure. The splice package 120a includes a splice housing 322 having a plurality of segments 324 that are coupled together end-to-end. Each of the segments 324 includes three elastic cantilevers 326 that are integrally formed with main bodies of the segments 324. The cantilevers 326 are elastic and function to provide a mechanical alignment structure for co-axially aligning the optical fibers 122, 124. Further details regarding structural features of the splice package 120a can be found at PCT Int'l Publication No. WO 2016/043922, which is hereby incorporated by reference in its entirety.

It will be appreciated that the interior of the housing 322 can be filled with adhesive after the optical fibers 122, 124 have been inserted therein. In this way, the optical fibers can be encapsulated and locked within the housing 322.

Figure 15:
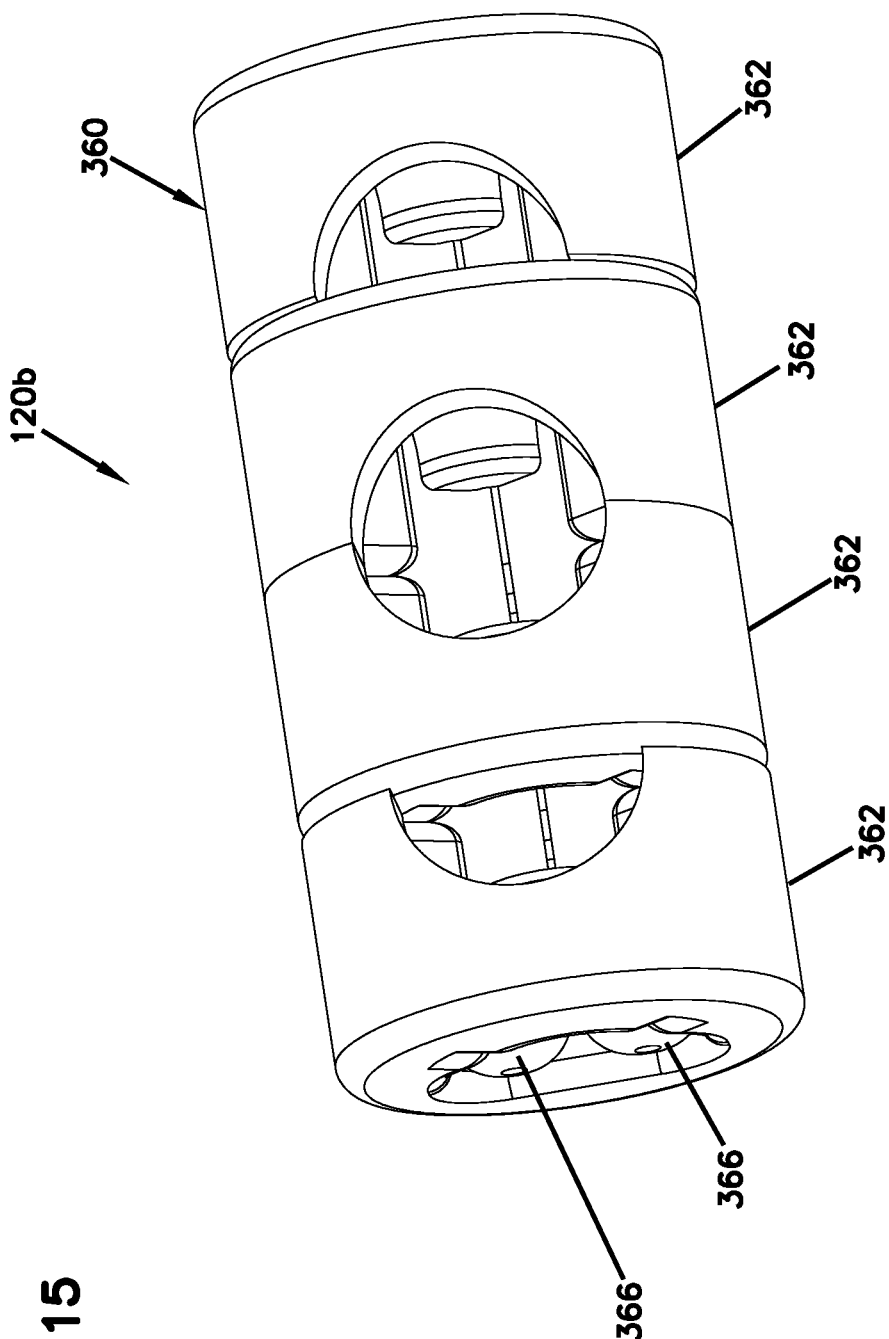
FIG. 15 shows another splice package in accordance with the principles of the present disclosure, the splice package including a splice housing containing rods defining an alignment groove for aligning optical fibers desired to be optically spliced together, the splice housing also including integral flexible cantilevers for depressing optical fibers into the alignment groove.
Figure 16:
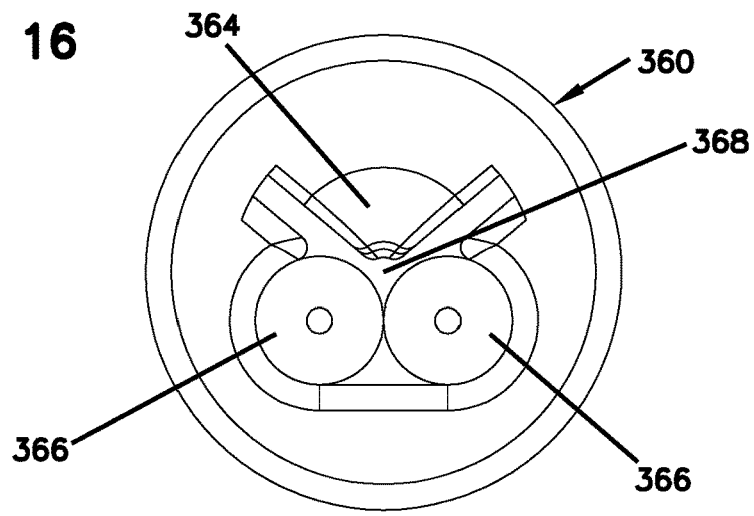
FIG. 16 is an end view of the splice package of FIG. 15.
Figure 17:
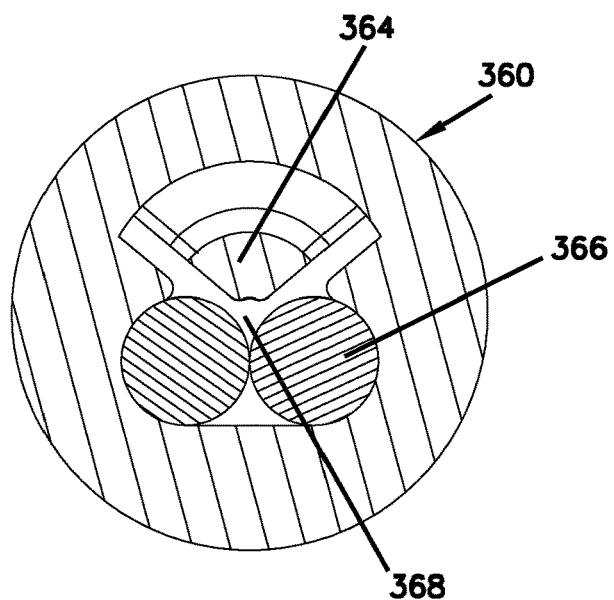
FIG. 17 is a cross-sectional view of the splice package of FIG. 15.

FIGS. 15-17 show another splice package 120b in accordance with the principles of the present disclosure. The splice package 120b includes a splice housing 360 formed by a plurality of housing segments 362 that are connected end-to-end. Each of the housing segments 362 includes at least one flexible cantilever arm 364 having a base end that is unitarily formed with a main body of its corresponding housing segment 362. Alignment rods 366 are mounted within the splice housing 360. The alignment rods 366 define a fiber alignment groove 368 in which the optical fibers 122, 124 are received to co-axially align the optical fibers 122, 124. Free ends of the cantilever arms 364 are adapted to press the optical fibers into the fiber alignment groove 368. The splice housing 360 can also be filled with adhesive for encapsulating the optical fibers.

Figure 19:
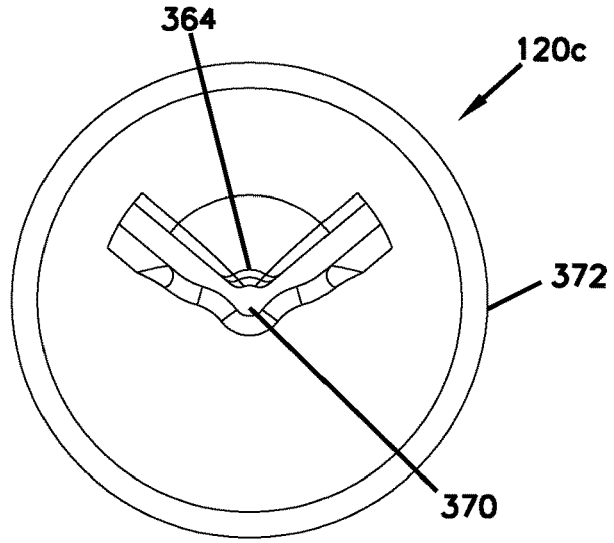
FIG. 19 shows an end view of an alternative splice package in accordance with the principles of the present disclosure, the splice package of FIG. 19 being similar to the splice package of FIG. 15 except an alignment groove is defined integrally with the splice housing rather than being defined by rods mounted within the splice housing.
Figure 18:
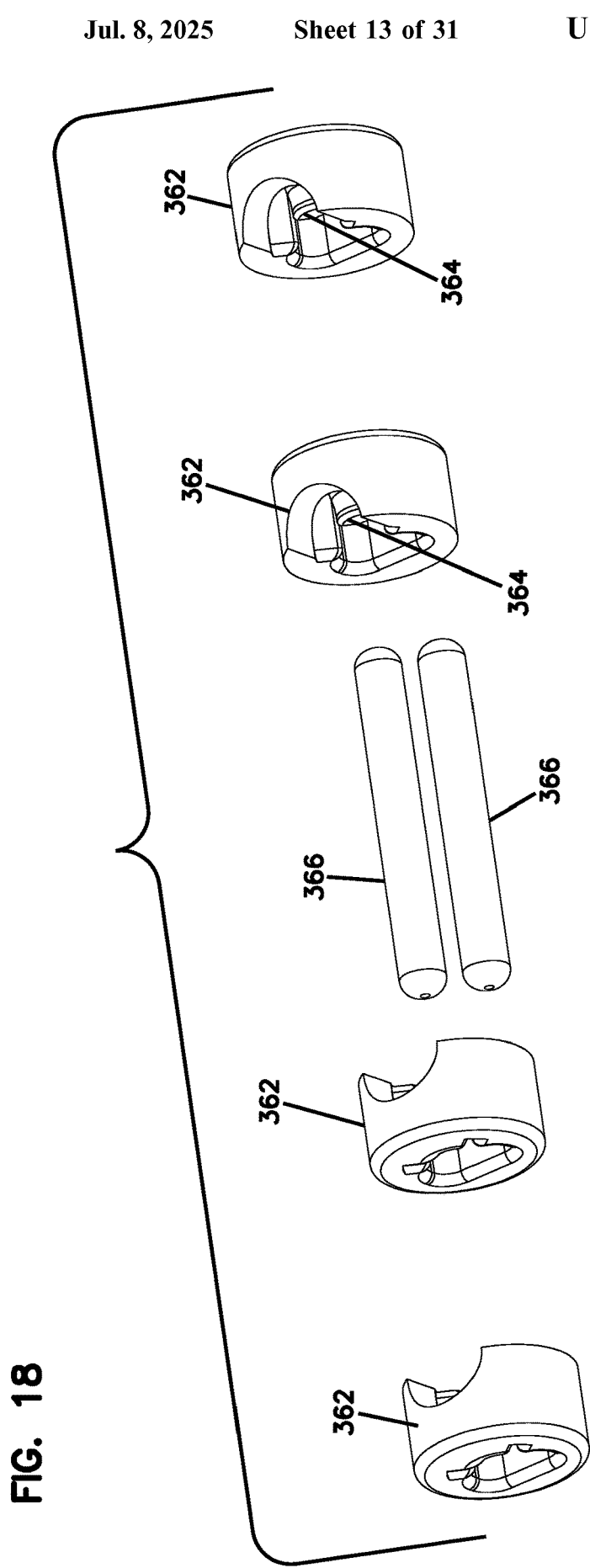
FIG. 18 is an exploded view of the splice package of FIG. 15.

FIG. 19 shows a further splice package 120c in accordance with the principles of the present disclosure. The splice package 120c has the same configuration as the splice package 120b except the rods 366 have been eliminated. Instead, an alignment groove 370 is defined integrally within a splice housing 372 of the splice package 120c. The splice housing 320 also includes flexible cantilever arms 364 of the type previously described and also can receive adhesive for locking the optical fibers within the housing.

Figure 20:
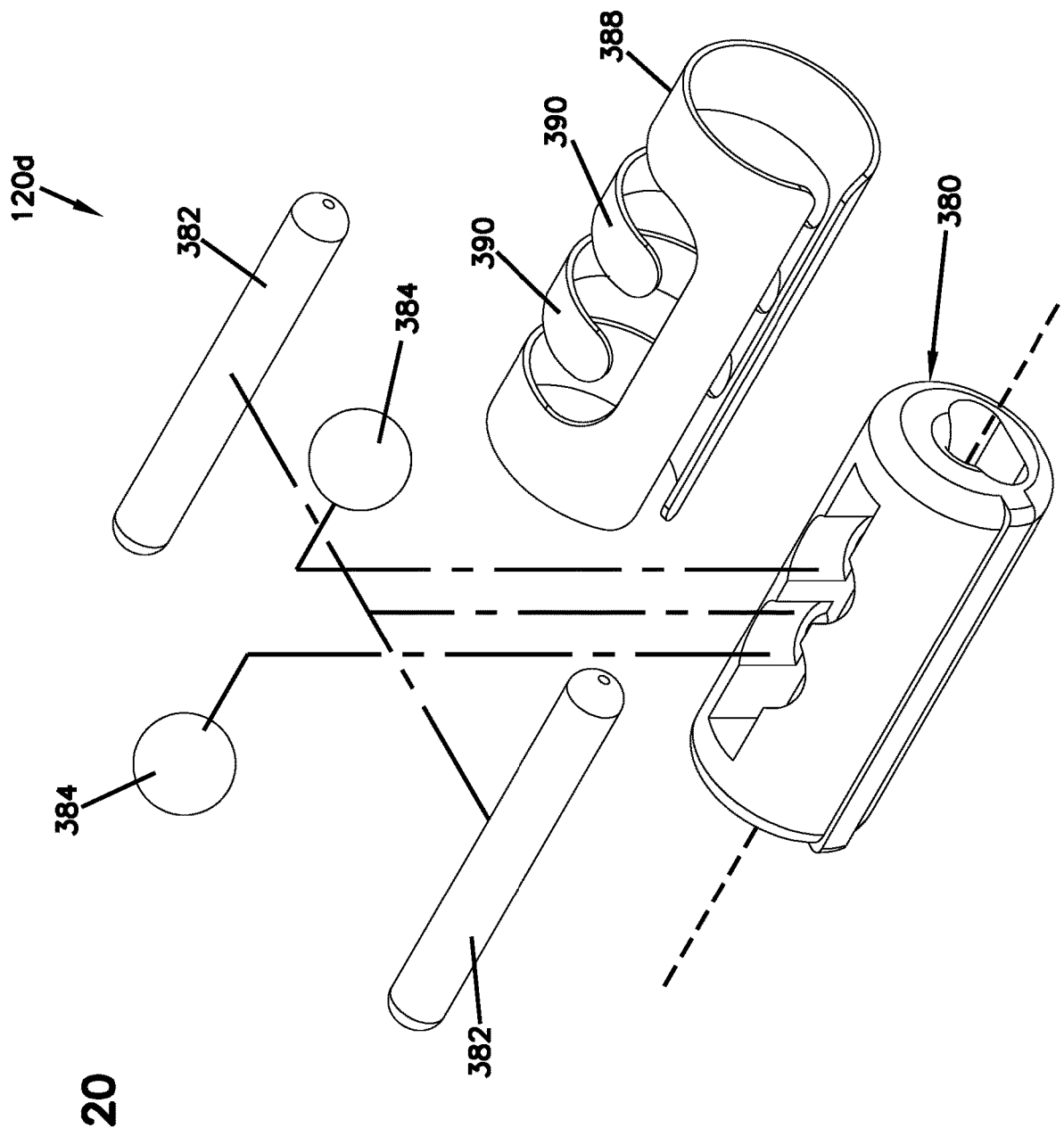
FIG. 20 is an exploded view of a further splice package in accordance with the principles of the present disclosure, the splice package includes a splice housing in which alignment rods are housed, the splice package also includes balls that are spring biased by a clip arrangement so as to be configured for biasing optical fibers desired to be spliced into an alignment groove defined by the rods.
Figure 21:
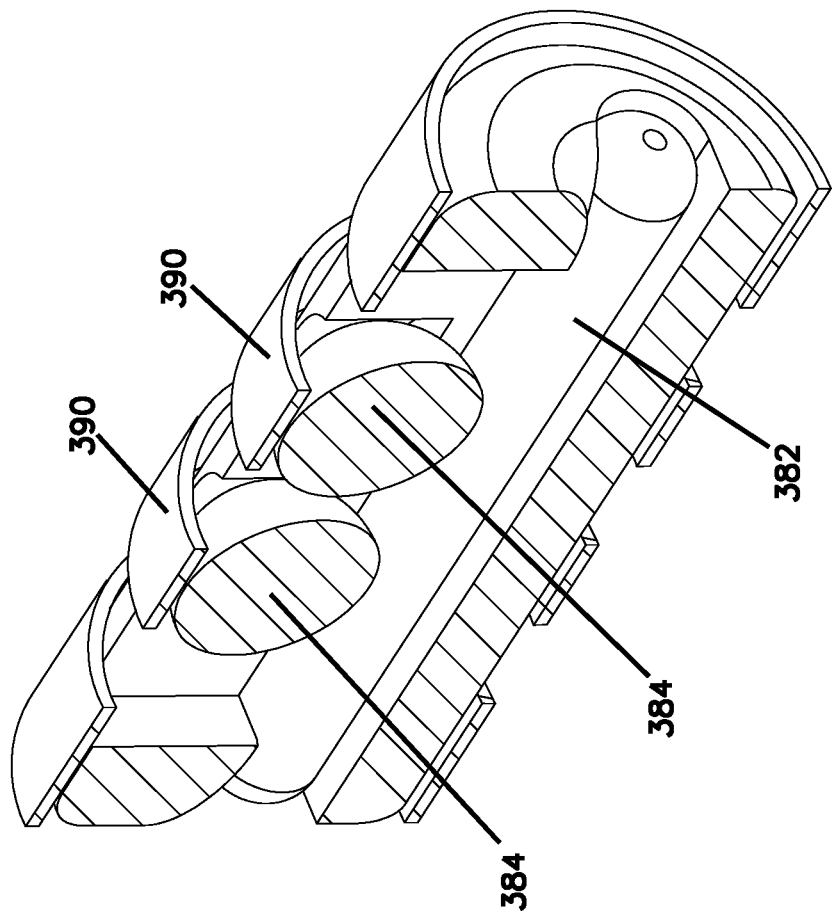
FIG. 21 is a cross-sectional view of the splice package of FIG. 20.
Figure 22:
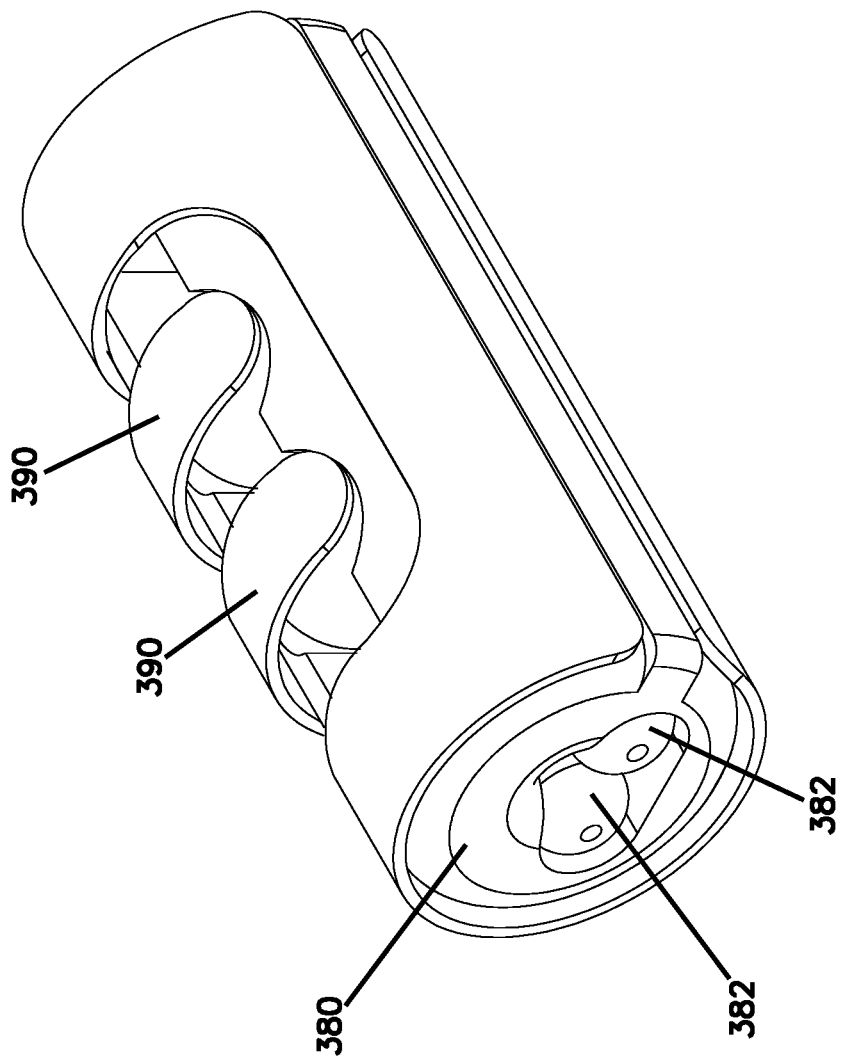
FIG. 22 is an assembled view of the splice package of FIG. 20.

FIGS. 20-22 illustrate a further splice package 120d in accordance with the principles of the present example. The splice package 120d includes a splice housing 380 in which alignment rods 382 and balls 384 are mounted. The rods 382 define a fiber alignment groove for receiving and co-axially aligning the optical fibers 122, 124. A sleeve 388 mounts over the housing 380. The sleeve 388 includes springs 390 that bias the balls 384 toward the groove 386. In this way, the balls 384 are spring biased so as to force the optical fibers 122, 124 into the groove 386 so as to maintain co-axial alignment. The housing 380 can be filled with adhesive for locking the internal components and the optical fibers in position. Further details of the splice package are disclosed by PCT Int'l Publication No. WO 2013/117598, which is hereby incorporated by reference in its entirety.

Figure 23:
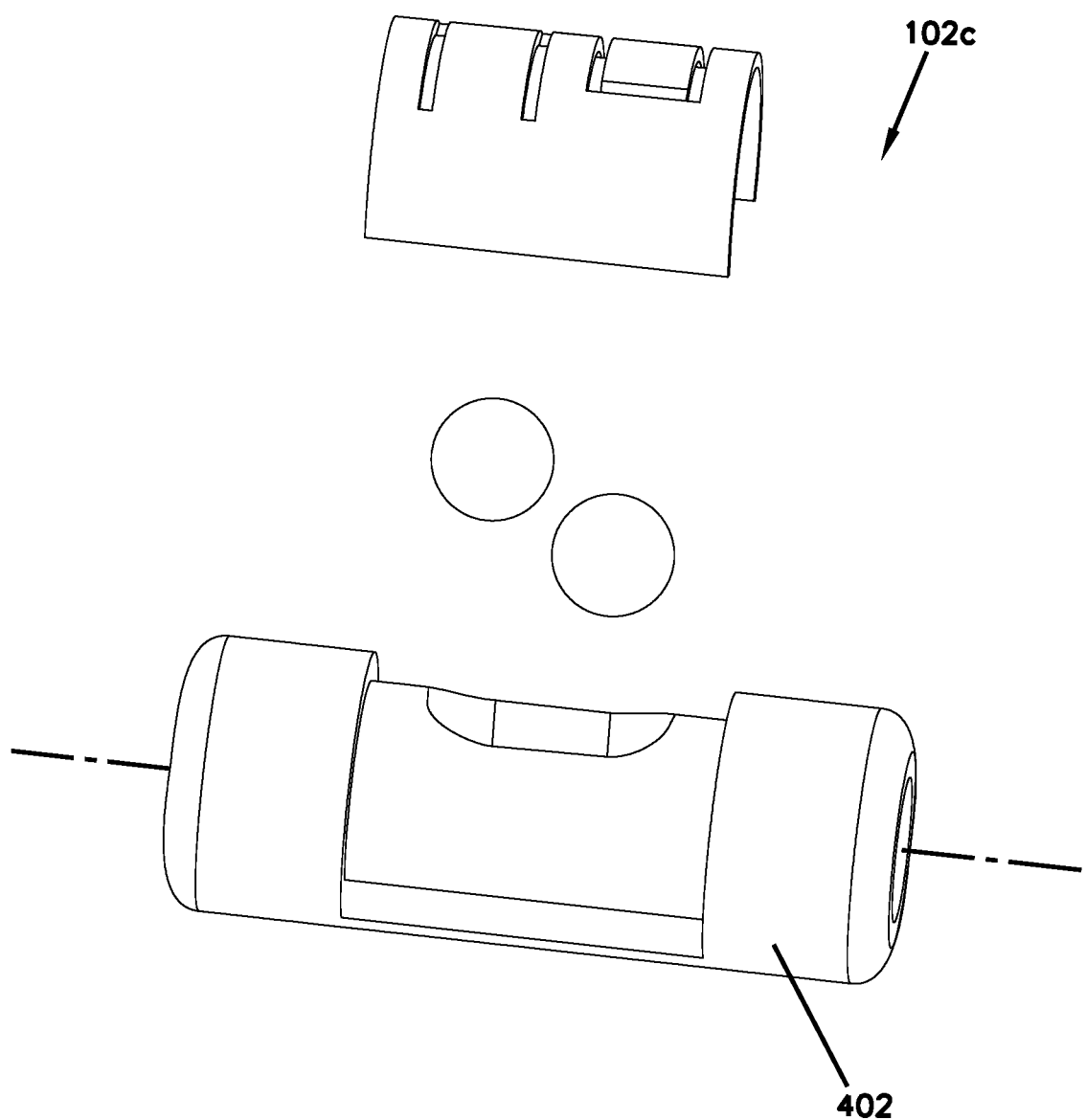
FIG. 23 is an exploded view of another splice package in accordance with the principles of the present disclosure, the splice package including a splice housing defining an integral fiber alignment groove for receiving optical fibers desired to be coaxially aligned and spliced together, the splice package also including balls mounted within a pocket of the splice housing that are spring biased by a clip arrangement toward the alignment groove.
Figure 24:
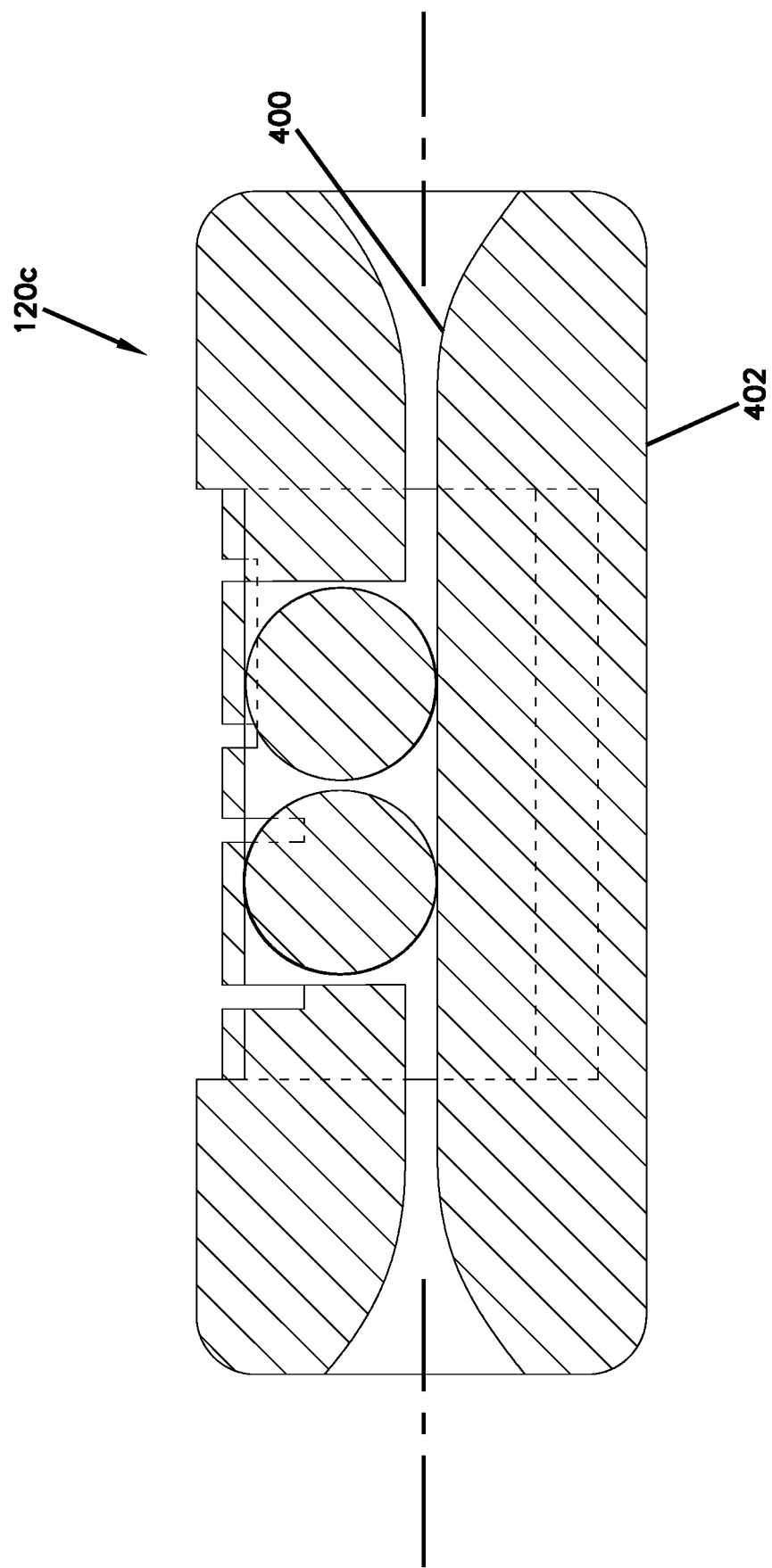
FIG. 24 is a cross-sectional view taken lengthwise through the splice package of FIG. 23.

FIGS. 23 and 24 illustrate a further splice package 120e in accordance with the principles of the present disclosure. The splice package 120e has the same configuration as the splice package 120d except the rods 382 have been replaced with an integral groove 400 defined by a splice housing 402 of the splice package 120e. Springs 404 bias balls 406 toward the groove. In this way, the balls are adapted to retain the optical fibers 122, 124 within the groove. The package can also include internal adhesive as described above with respect the earlier embodiments.

FIGS. 35-41 illustrate a further splice package 120f in accordance with the principles of the present disclosure. The splice package 120f aligns and splices a first set 1022 of the first optical fibers 122 with a second set 1024 of the second optical fibers 124. In the example shown, each set (1022, 1024) includes twelve fibers, though the sets can include more or fewer fibers than twelve. In some examples, the set 1022 of fibers 122 can be ribbonized; likewise, in some examples, the set 1024 of fibers 124 can be ribbonized. Typically, the first set 1022 has the same number of fibers as the second set 1024, with the goal to align each of the fibers 122 of the first set 1022 with a corresponding fiber 124 of the second set 1024 using the splice package 120f or another multi-fiber splice package.

The splice package 120f includes a housing 1100 having a first end 1102, a second end 1104, a top 1106 and a bottom 1108. The first end 1108 defines a first opening to an alignment cavity 1110 and the second end 1104 defines an opposite second opening to the alignment cavity 1110. The first and second openings each provide for sets of optical fibers (122, 124) to be centered and oriented in the bottom of the splice package 120f. The bottom 1108 has a plurality of groove structures 1112 integrally formed, such as a V-grooves, or gaps, or slots. It will be appreciated that the groove structures 1112 can include other groove profiles using various materials and manufacturing processes. In this example, the groove structures 1112 are V-grooves in parallel alignment that extend along the fiber axis 128.

The top 1106 of the housing 1100 comprises a planar region 1114. The planar region 1114 contains a recess 1116 including a plurality of cantilever members 1118 and 1120 configured to press the optical fibers in the grooves.

In this example, a first set of cantilever members 1118 are generally on the first end 1102 and can extend downwardly in the recess 1116 at an angle toward the optical fibers 122. A second set of cantilever members 1120 are generally on the second end 1104 and can extend downwardly at an angle toward the optical fibers 124 at the second opening. The cantilever members (1118, 1120) can be flexible and configured for urging each of the optical fibers into their respective groove structures to align the fibers 122 with the fibers 124 in the groove structures.

The recess 1116 has an open bottom such that a fiber alignment region 1122 is made visible between the first and second sets of cantilever members 1118 and 1120. The cantilever members are arranged and configured on opposite sides of the fiber alignment region 1122. The cantilever members are shown having one row on each side of the fiber alignment region 1122. It will be appreciated that other embodiments can include two or more rows on each side of the fiber alignment region 1122.

Figure 36:
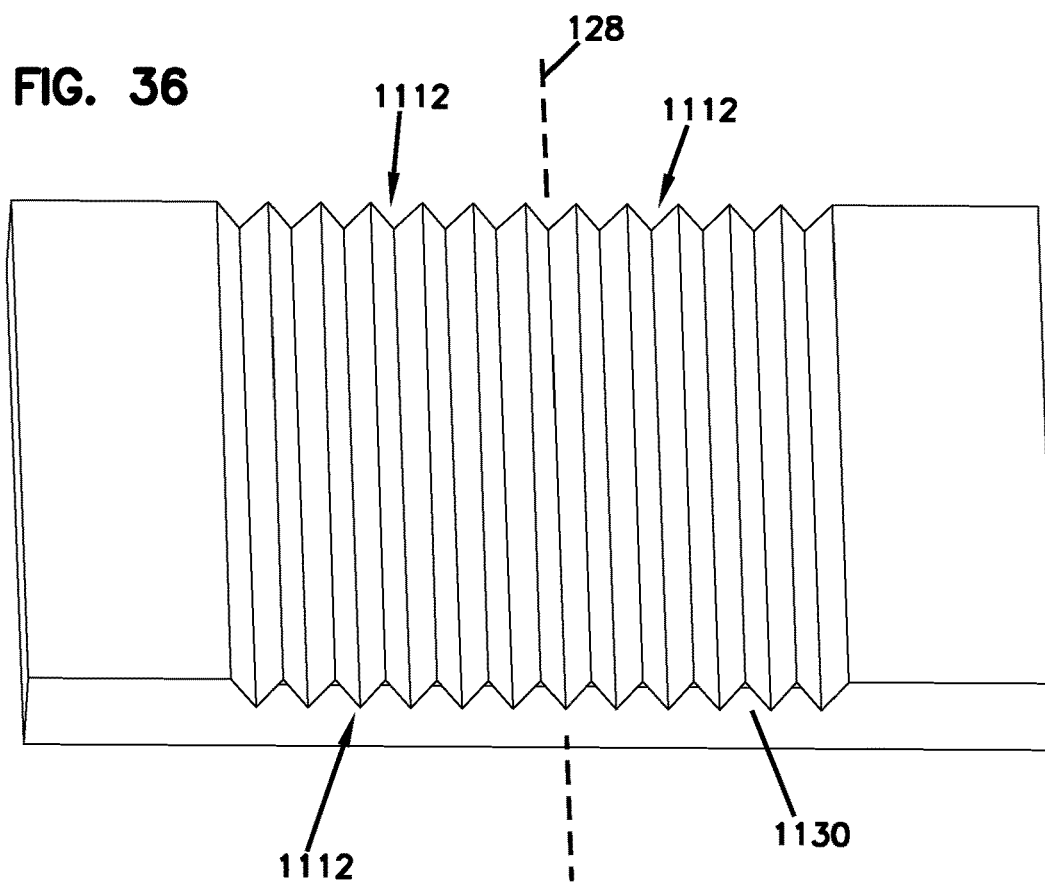
FIG. 36 is a perspective view of a portion of a multi-piece embodiment of the multi-fiber splice package of FIG. 35.
Figure 37:
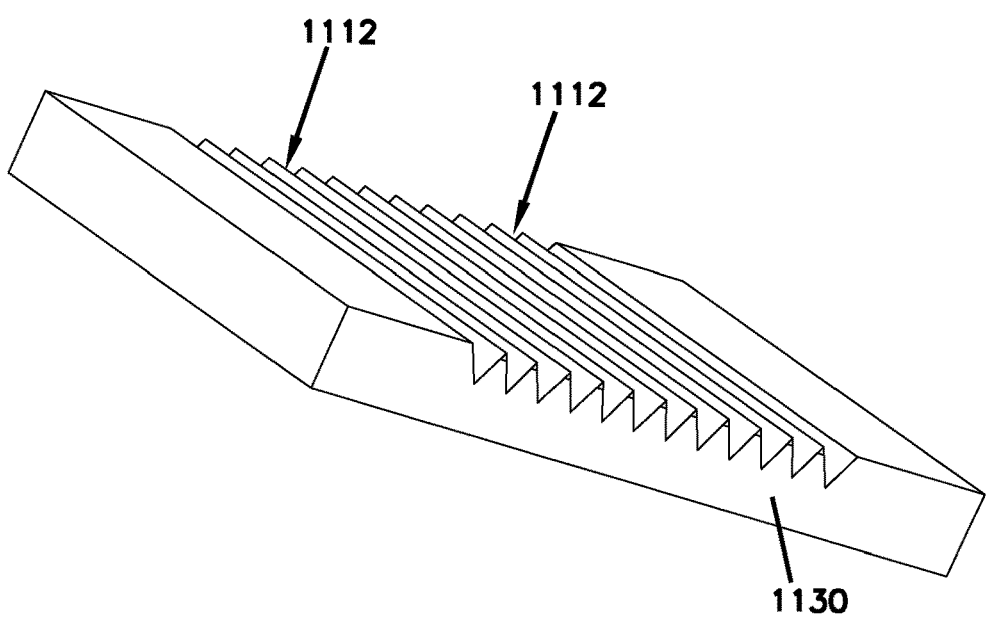
FIG. 37 is a further perspective view of the portion of FIG. 36.
Figure 38:
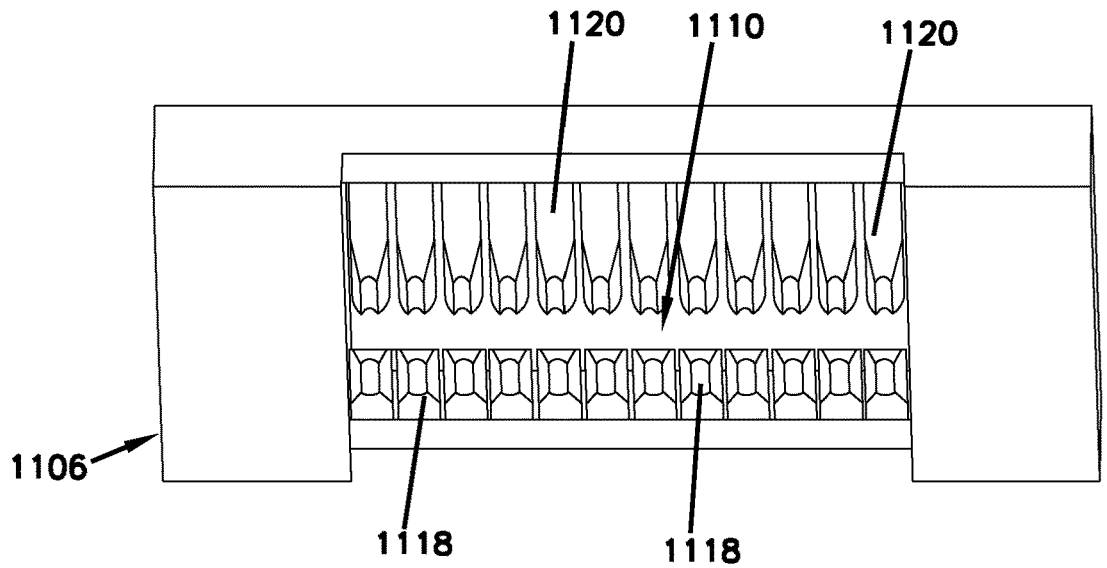
FIG. 38 is a perspective view of a further portion of the multi-piece embodiment of the multi-fiber splice package of FIG. 36.
Figure 39:
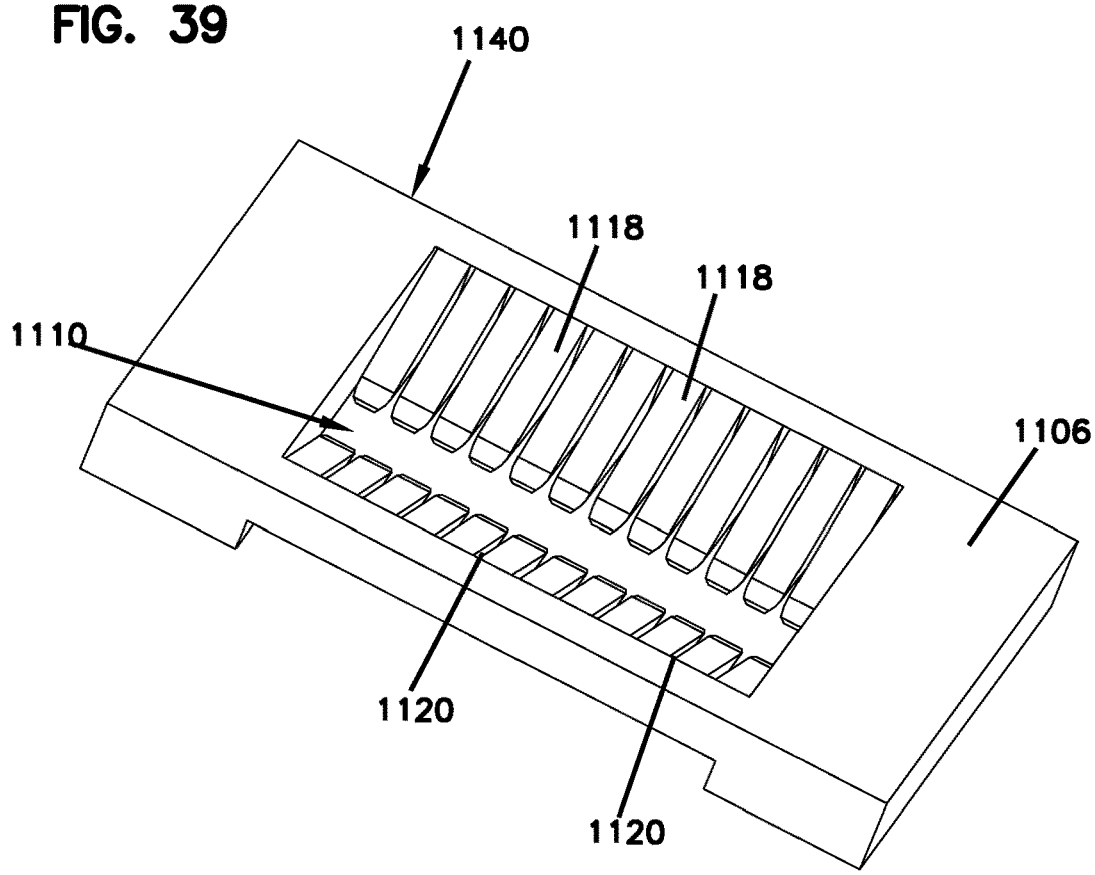
FIG. 39 is a further perspective view of the portion of FIG. 38.
Figure 40:
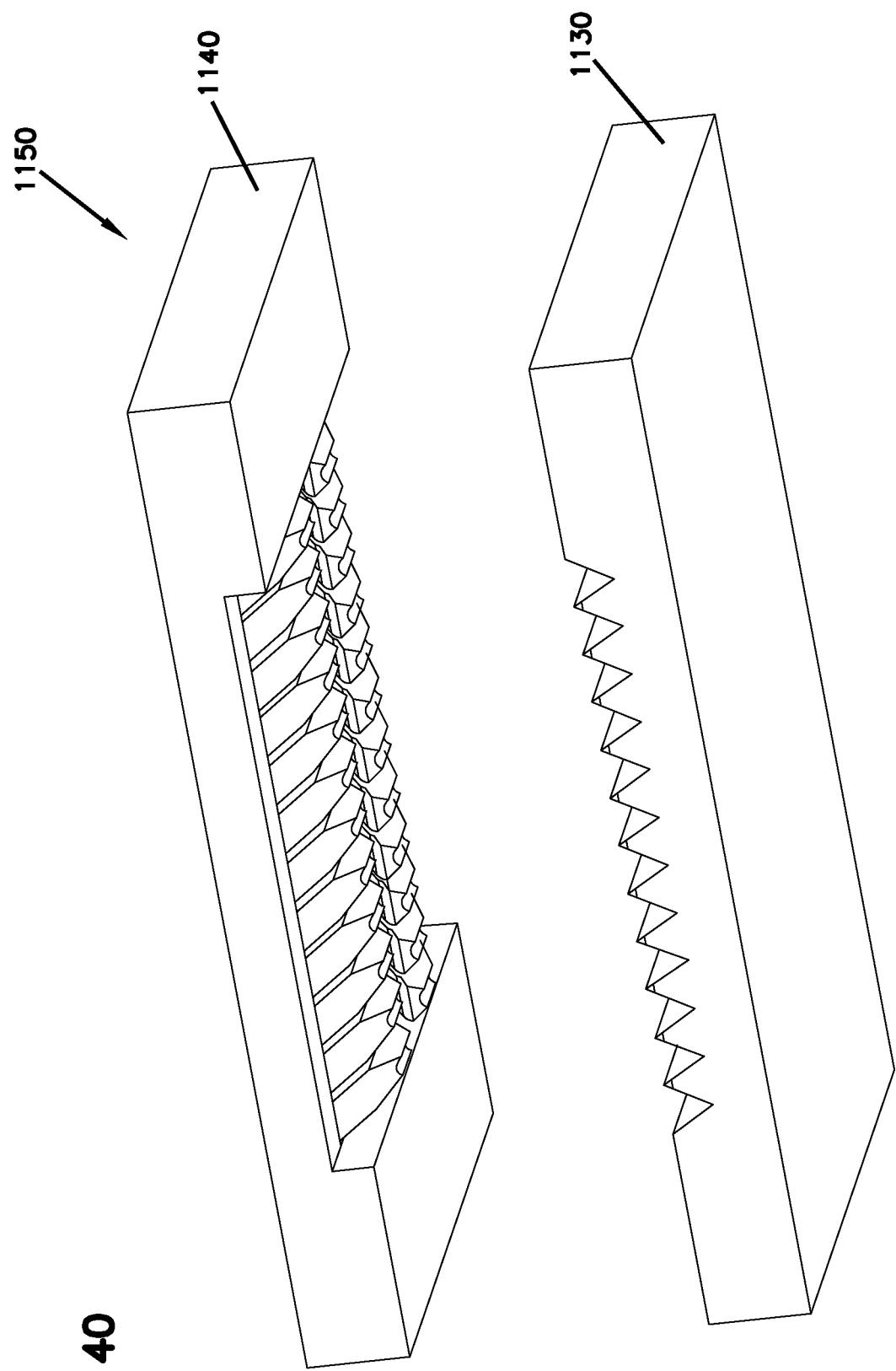
FIG. 40 is an exploded perspective view of the portions of FIGS. 38 and 39.
Figure 41:
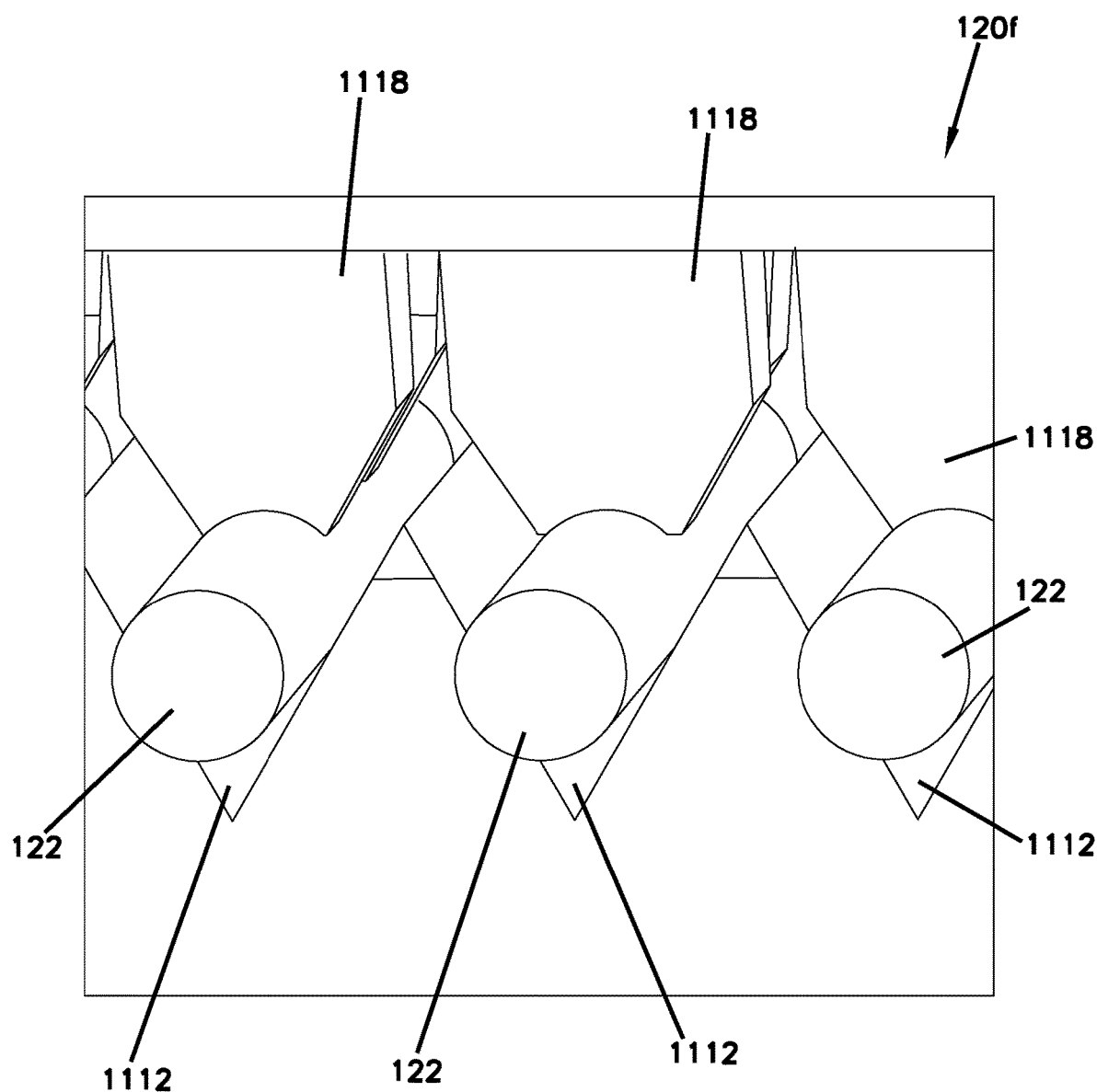
FIG. 41 is an enlarged view of a portion of the splice package of FIG. 35.

The splice package 120f can be assembled as a single module or unit including the groove structures and cantilever members, or alternatively as a multi-piece assembly. FIGS. 36 and 37 show a bottom member 1130 of an example multi-piece assembly 1150 (FIG. 40) embodiment for the splice package 120f. FIGS. 38 and 39 show a top member 1140 of the example multi-piece assembly 1150 (FIG. 40). FIG. 41 shows an enlarged view of the interaction between the cantilever members 1118, the fibers 122, and the grooves 1112, the cantilever members 1118 urging the fibers 122 into the grooves 1112.

The package 120f can also include internal adhesive as described above with respect the earlier embodiments. That is, in certain examples, the housing 1100 can contain an adhesive that fixes the ends of sets (1022, 1024) of the first and second optical fibers 122, 124 within the splice package 120f. Example adhesives include epoxy, light curable adhesive (e.g., ultraviolet light curable adhesive), thermo-form adhesive, thermo-set adhesive, index-matching adhesive or other adhesives. The package 120f can also include a non-adhesive coupling medium (e.g., a thixotropic index matching gel). In some examples, the ends of the sets (1022, 1024) of fibers are co-axially aligned within the package 120f; there is an index matching gel (e.g., a thixotropic index matching gel) between opposing ends of the sets (1022, 1024) of fibers, and there is adhesive on opposite sides of the gel for retaining the sets (1022, 1024) of fibers in place.

An important aspect of the splice package 120f is that the splice package 120f does not substantially alter normal bending of the sets (1022, 1024) of optical fibers 122, 124. One reason the splice package 120f does not substantially alter normal bending of the sets (1022, 1024) of optical fibers 122, 124 is that the splice package 120f is relatively short in length. One example of the splice package 120f has a length less than or equal to 10 millimeters (mm). In another example, the length L of the splice package 120f is less than or equal to 7.5 mm. In still another example, the length L of the splice package 120*f* is less than or equal to 6 mm or less than or equal to 5 mm and/or the splice package 120*f* has a weight less than or equal to 25 milligrams, or less than or equal to 22 milligrams, or less than or equal to 20 milligrams, or less than or equal to 18 milligrams.

Another reason the splice package 120*f* does not substantially affect the normal bending of the sets (1022, 1024) of the first and second optical fibers 122 and 124 is that the splice package 120*f* is relatively light. Because the splice package 120*f* is relatively light, the weight of the splice package 120*f* does not cause meaningful deformation or bending of the optical fibers 122, 124. The light weight of the splice package 120*f* also inhibits substantial loading caused by vibrations or other accelerations from being applied to the optical fibers 122, 124. Thus, for certain applications, the splice package 120*f* can be installed or positioned in a free-floating configuration in which the splice package 120*f* is not fixated to another structure such as a connector housing or a splice tray. In certain examples, the weight of the splice package 120*f* is supported by the natural elastic characteristics of the optical fibers 122, 124.

In certain examples, the fiber optic splice package 120*f* has a weight that is less than a combined spring force (i.e., a sum of individual spring forces) corresponding to elastic bending characteristics of some or all of the fibers 122, 124 of the sets (1022, 1024) of optical fibers 122, 124.

Figure 6:
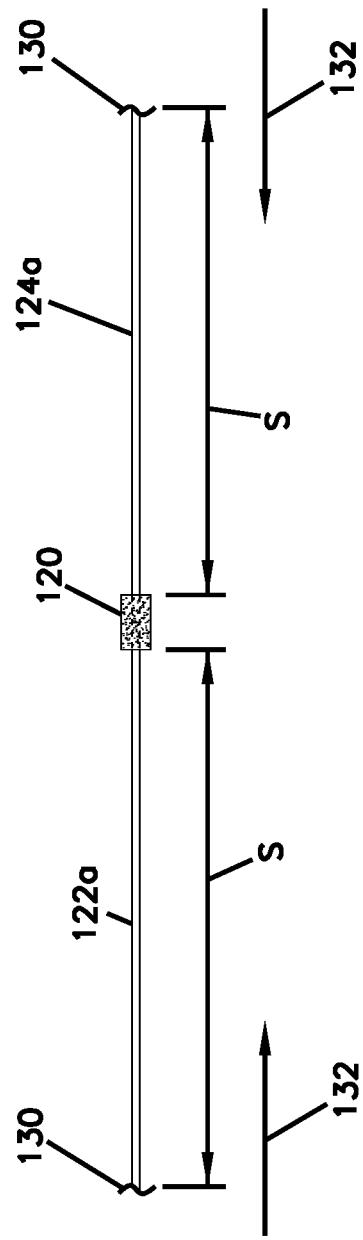
FIG. 6 shows the splice package of FIG. 4 with a force being applied to the optical fibers to cause the optical fibers to elastically bend.
Figure 7:
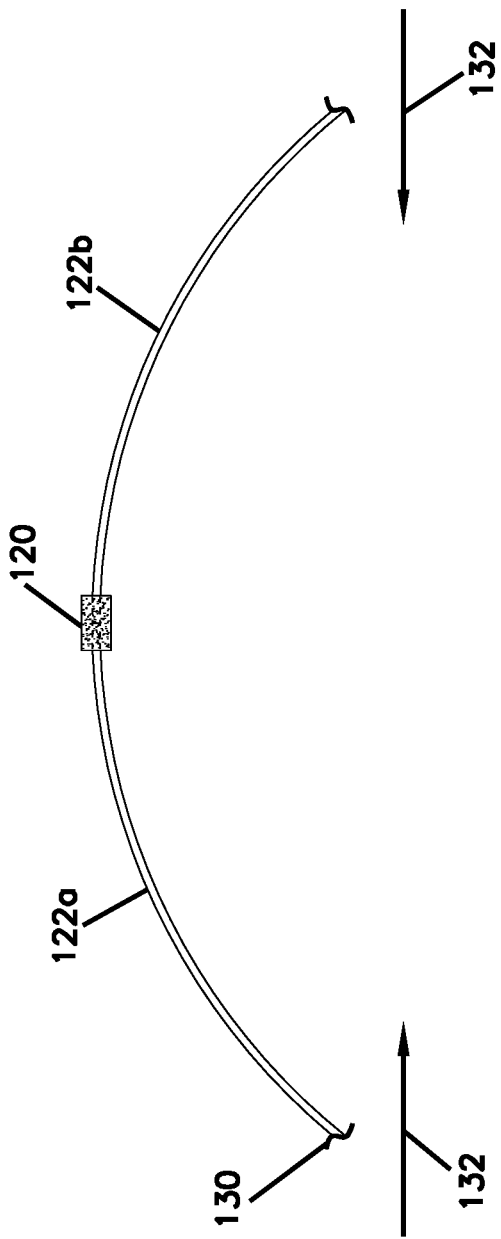
FIG. 7 shows the optical fibers elastically bent along a natural curvature with a spring force of the optical fibers supporting a weight of the splice package.

A test for determining whether the splice package 120*f* has a weight less than the combined elastic fiber bending force corresponding to the type of optical fibers in the sets 1022, 1024 intended to be spliced is similar to what is shown at FIGS. 6 and 7, except that the fibers 122, 124 can be replaced with fiber sets 1022 and 1024, respectively, and the splice package 120 represents the splice package 120*f*. According to this test, as described above, as the corresponding fiber set portions are forced together, the sets of optical fibers elastically bend along a natural curvature. If the splice package 120*f* is lighter than the spring force corresponding to the combined elastic bending characteristics of the flexed optical fiber lengths of the sets (1022, 1024) of individual fibers (122, 124) the splice package 120*f* can be supported above the fiber engagement locations and held suspended or floating by the spring force of the flexed optical fibers, as shown in FIG. 7.

In other examples, the fiber optic splice package 120*f* has a weight that is less than a combined spring force generated by the inherent elastic bending characteristics of the sets (1022, 1024) of spliced optical fibers when the spliced optical fibers are bent at their minimum bend radius.

Figure 25:
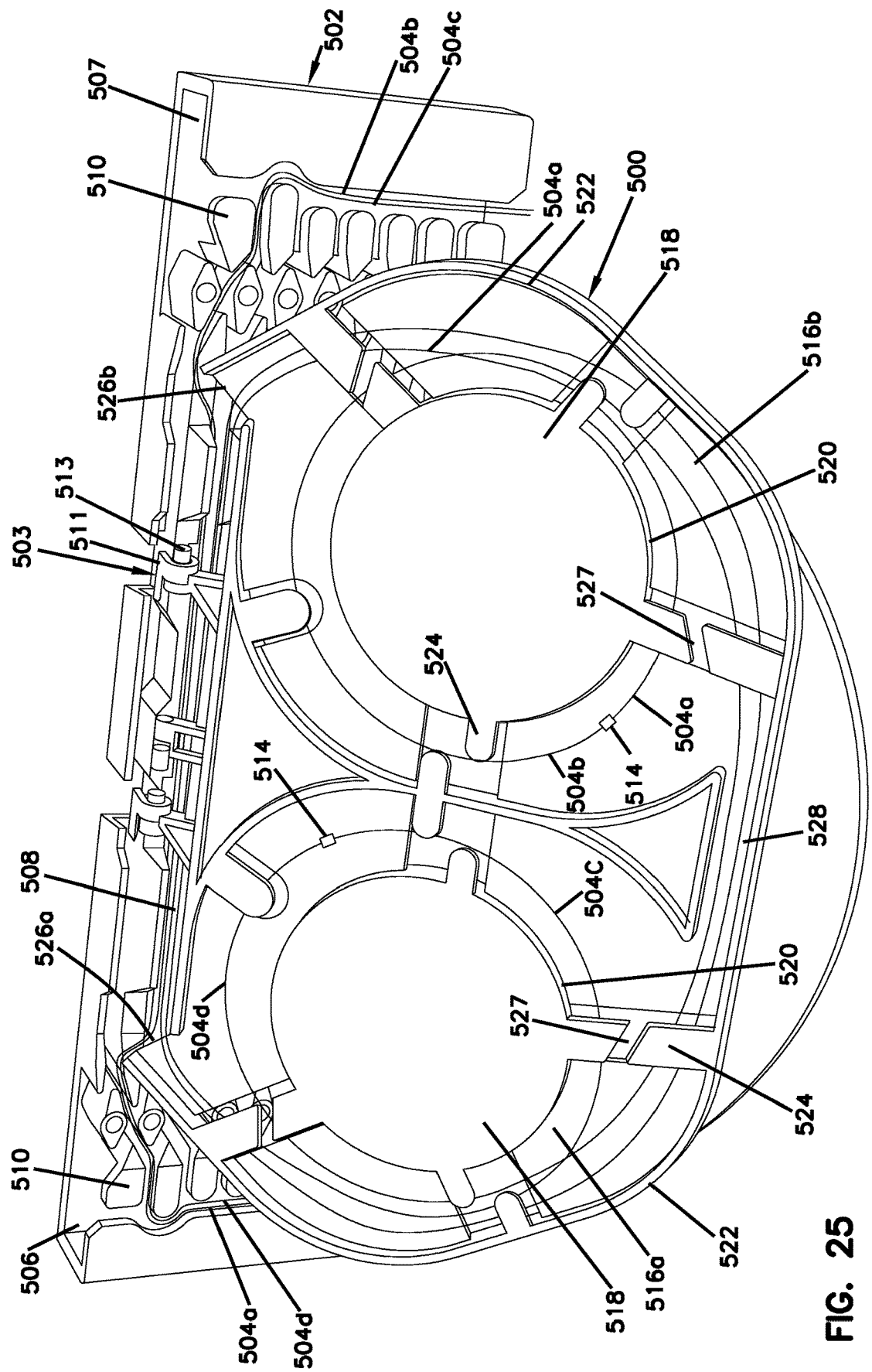
FIG. 25 depicts another manager in accordance with the principles of the present disclosure for managing optical fibers and/or optical fiber splices.

Further details of the splice package 120*f* and multi-fiber splice packages in general are disclosed by PCT Int'l Publication No. WO 2016/043922, which is hereby incorporated by reference in its entirety. FIG. 25 illustrates a manager in accordance with the principles of the present disclosure for managing optical fibers and/or optical fiber splices. In one example, the manager includes a tray 500. In one example, tray 500 can include a generally rigid, molded plastic construction. As depicted, tray 500 is pivotally connected to a base 502. The base 502 can include a plurality of tray attachment locations 503 for pivotally attaching a plurality of the trays 500. The base 502 also includes a plurality of fiber routing paths for routing optical fibers to each of the tray attachment locations 503. As shown at FIG. 25, four optical fibers 504*a*-504*d* are shown routed along vertical fiber routing paths 506, 507 defined by the base 502 and horizontal fiber routing paths 508 of the base 502. A plurality of vertically spaced-apart fiber bend radius limiters 510 can be provided to transition optical fibers from the vertical fiber routing paths 506, 507 to the horizontal fiber routing paths 508. The horizontal fiber routing paths 508 can correspond generally with the tray attachment locations 503 such that optical fibers can be routed to the trays 500 generally at the pivotal hinge locations so as to minimize movement of the optical fibers as the trays 500 are pivoted relative to the base 502.

Referring still to FIG. 25, the tray 500 includes an integrated pivot feature 513 (e.g., one or more pins, members, hinge-pins, etc.) that connects to one of the attachment locations 503 of the base 502 by means such as a snap-fit connection. For example, the tray attachment location 503 can include receivers 511 that receive portions of the pivot feature 513 in a snap-fit relation which retains the pivot feature 513 while allowing the pivot feature 513 to be free to pivot about a hinge axis 512 relative to the base 502.

The tray 500 does not include structure for fixating fiber optic splices 514 relative to the tray 500. The fiber optic splices 514 can be protected by lightweight splice packages of the type described herein, by a re-coat process, or by other means. The splice tray 500 does not have a dedicated region for fixating fiber optic splice protectors to the splice tray 500 and/or for managing the fiber optic splice protectors. Instead, the vast majority of the surface area of the tray 500 is dedicated to managing optical fibers (e.g., optical fibers that are spliced together) via optical fiber loops. The tray 500 preferably includes at least two loop storage regions 516*a*, 516*b* where excess fiber length is looped (e.g., coiled) and stored. In the depicted example, the tray 500 includes two loop storage regions. In other examples, trays in accordance with the principles of the present disclosure may include three, four, five, six or more separate loop storage regions.

Referring still to FIG. 25, the loop storage regions 516*a*, 516*b* are separated or segregated relative to one another. Each of the loop storage regions 516*a*, 516*b* includes a spool-like structure 518 including exterior curved bend-radius limiting surfaces 520. As depicted, the bend-radius limiting surfaces 520 extend along circular paths. However, in other examples, other shaped paths such as race-track shaped paths, oval paths, elliptical paths or other paths can be defined. Each of the loop storage regions 516*a*, 516*b* also includes a containment structure 522 which surrounds the majority of the corresponding spool structure 518. The containment structures 522 can include walls such as curved walls. The spool structures 518 and the containment structures 522 can project upwardly from a major surface (e.g., a floor) of the tray 500. Optical fibers can be looped and stored within the space defined between the spool structures 518 and the corresponding containment structures 522. In certain examples, tabs 524 can be provided for retaining the optical fibers on the tray 500. The tabs 524 can project from the containment structures 522 and/or the spool structures 518 and can be configured to overhang the optical fiber loops to retain the optical fibers in the region between the spool structures 518 and the containment structures 522. Thus the optical fibers are captured between the floor of the tray 500 and the tabs 524. Gaps 527 can be provided between opposing tabs to allow optical fiber coils to be inserted into the loop storage regions 516*a*, 516*b*.

As shown at FIG. 25, the fiber optic splices 514 are randomly positioned along loop paths on the splice tray 500, but the positioning need not be random (e.g., the splice locations can be coordinated). As depicted at FIG. 25, the fiber optic splices 514 are positioned within the loop storage regions 516*a*, 516*b* where the excess fiber length is looped (e.g., coiled) and stored. In the depicted example, the excess fiber is shown coiled in circular loops with the fiber optic splices 514 positioned along the curvatures of the loops. The splices 514 preferably are not fixed or anchored to the splice tray 500. Instead, the fiber optic splices 514 are free-floating and are supported by the optical fibers 504a, 504d themselves (although some contact may occur with the splice tray 500 as well). In certain examples, one or more of the splices 514 are positioned along a curved or bent portion of an optical fiber storage loop. In certain examples, the curved or bent portion is defined by the natural inherent curvature of the optical fiber or fibers as the optical fiber or fibers are looped in a storage loop such as a circular coil. By positioning these splices 514 within the loop storage regions 516a, 516b without providing separate anchoring of the splices 514, the splice density of the splice tray 500 can be enhanced. In certain examples, the tray 500 can support a splice density of at least one splice per ten square centimeters of tray footprint area, or of at least one splice per eight square centimeters of tray footprint area, or at least one splice per six square centimeters of tray footprint area.

Referring still to FIG. 25, the tray 500 includes fiber entrance/exit locations 526a, 526b. The fiber entrance/exit locations 526a, 526b are located on opposite sides of the pivot feature 513. The fiber entrance/exit locations 526a, 526b allow optical fibers to be routed from the base 502 onto the tray 500 and vice versa. Example fiber routing paths are shown at FIG. 25. For example, optical fiber 504a is routed up the vertical fiber routing path 506 of the base 502 and then across the horizontal fiber routing path 508 of the base 502 to the fiber entrance/exit location 526b. The fiber 504a is then at least partially coiled within the loop storage region 516b and is spliced to optical fiber 504b at the loop storage region 516b. Optical fiber 504b is also at least partially looped within the loop storage region 516b and is then routed along a connection passage 520a between the loop storage regions 516a, 516b to the storage region 516a. Within the loop storage region 516a, the optical fiber 504b extends along the containment structure 522 to the fiber entrance/exit location 526a. The optical fiber 504b exits the tray 500 at the fiber entrance/exit location 526a and then is routed along the horizontal fiber routing path 508 of the base 502 to the vertical fiber routing path 507. At the vertical fiber routing path 507, the optical fiber 504b is routed in a downward direction. Optical fiber 504c is routed up the vertical fiber routing path 507 of the base 502 to the horizontal routing path 508. The optical fiber 504c is then routed horizontally along the horizontal routing path 508 to the fiber entrance/exit location 526a. Optical fiber 504c enters the tray 500 at the fiber entrance/exit location 526a. Upon entering the tray 500, at least a portion of the optical fiber 504c is coiled, looped, or otherwise bent in the loop storage region 516a. At the loop storage region 516a, the optical fiber 504c is spliced to optical fiber 504d. Optical fiber 504d also includes at least a portion that is bent, looped, coiled or otherwise looped within the loop storage region 516a. From the loop storage region 516a, optical fiber 504d extends to the loop storage region 516b through the connection passage 528. Within the loop storage region 516b, the optical fiber 504d extends along the containment structure 522 to the fiber entrance/exit location 526b where the optical fiber 504d exits the tray 500. From the fiber entrance/exit location 526b, the optical fiber 504d extends horizontally across the horizontal fiber routing path 508 of the base 502 to the vertical fiber routing path 506. At the vertical fiber routing path 506, the optical fiber 504d is routed in a downward direction. While two optical splices and four optical fibers are depicted, it will be appreciated that many more optical splices and optical fibers can be managed by the tray 500. Additionally, in certain examples, the vertical fiber routing paths 506 and the horizontal fiber routing paths 508 can include channels.

Figure 26:
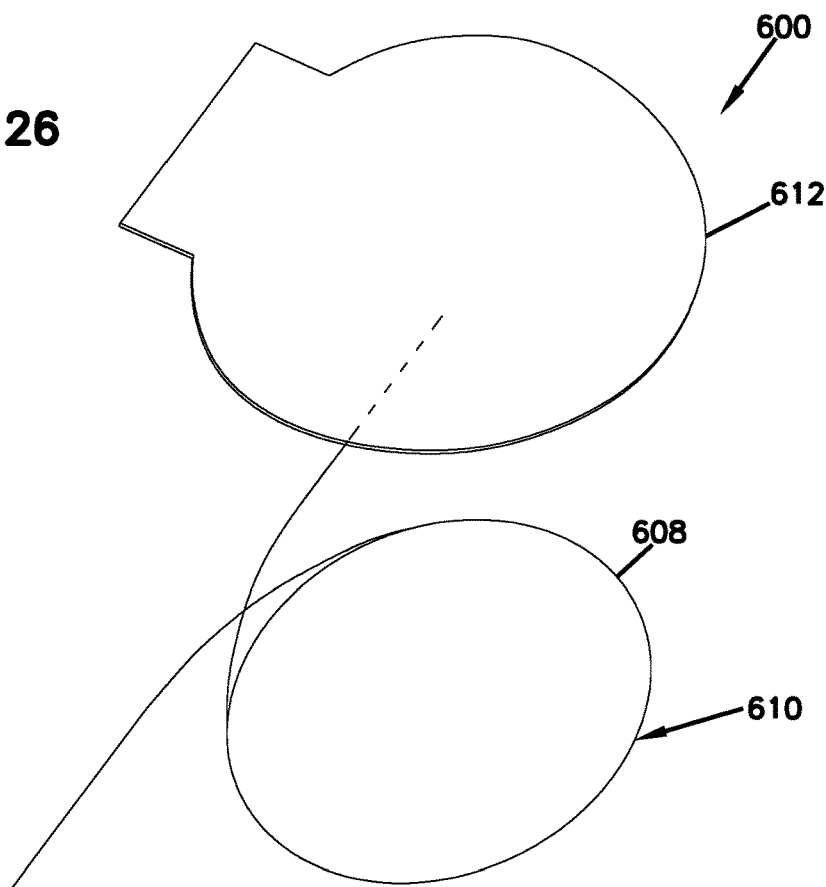
FIG. 26 is an exploded view of another manager in accordance with the principles of the present disclosure for managing optical fibers and/or optical fiber splices.
Figure 27:
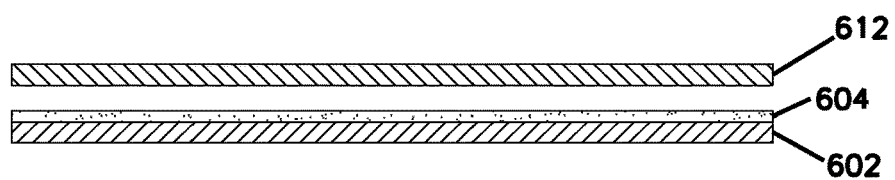
FIG. 27 is a cross-sectional view through the manager of FIG. 26.

FIG. 26 depicts another manager 600 in accordance with the principles of the present disclosure for managing optical fibers (e.g., optical fiber loops) and/or for managing optical fiber splices between optical fibers. As depicted, the manager 600 includes a substrate 602 which can have a construction such as a polymeric sheet. In certain examples, an adhesive layer 604 (e.g., a layer of pressure sensitive adhesive) can be provided on the substrate 602. The substrate 602 can include a main portion 605 and a connection portion 606. As depicted, connection portion 606 is integral with the main portion 605 and is depicted as a tab. The adhesive layer 604 can be provided on both the main portion 605 and the connection portion 606. As depicted, the main portion 605 is shown as being generally circular but can also be other shapes (e.g., square, rectangular, oval, elliptical, etc.). The main portion 605 is adapted for retaining and storing a fiber loop 608. In certain examples, the fiber loop 608 includes a fiber optic splice 610. The optical fibers and the optical fiber splice 610 of the fiber loop 608 can be positioned and secured relative to the substrate 602 by the adhesive layer 604. The adhesive strength of the adhesive layer 604 is preferably strong enough to hold the fiber loop 608 in place but weak enough to allow the fiber loop 608 to be removed from the substrate 602 as needed. The manager 600 can also include a protective layer 612 that is secured to the substrate 602 by the adhesive layer 604. The fiber loop 608 is preferably captured and protected between the substrate 602 and the protective layer 612. It is preferred for the protective layer 612 to be peel-able relative to the substrate 602. In this way, the protective layer 612 can be peeled from the substrate 602 to provide access to the fiber loop 608. FIG. 27 is a cross-sectional view of the manager 600. In use of the manager 600, the fiber loop 608 can be secured at the main portion 605 of the substrate 602, and the optical fibers forming the fiber loop 608 can be routed to and from the substrate 602 laterally from the connection portion 606.

It is preferred for the substrate 602 and the protective layer 612 to be flexible and to have flexibilities that are substantially more flexible than a standard tray. In certain examples, both the substrate 602 and the protective layer 612 are constructed from a polymeric sheet of material. In certain examples, the manager 600 has a flexible construction with an inherent flexibility that allows the substrate and the protective layer to be flexed like a living hinge. In certain examples, the substrate 602 and the protective layer 612 are flexible sheets. In certain examples, the substrate 602 and/or the protective layer 612 can be flexed like a living hinge to a range of motion that includes at least 45 degrees without breaking or damaging the manager 600. In certain examples, the manager 600 has a flexible construction that includes one or more substrates with inherent flexibility that allows the substrate to flex/pivot in a living hinge at or at least 45, 90, 135 or 180 degrees without breaking. In certain examples, the manager 600 has a construction that allows the manager to be flexed more than a standard tray, but prevents the manager from being bent along a curvature having a radius smaller than a minimum bend radius of the optical fiber intended to be managed on the manager. In certain examples, manager has a construction that allows it to be bent along a curvature having a radius smaller than 10 centimeters (cm), or 8 cm, or 6 cm, or 5 cm, or 4 cm, or 3 cm or 2 cm without breaking or kinking, and optionally prevents the manager from being bent along a curvature having a radius smaller than a minimum bend radius of the optical fiber intended to be managed on the manager.

Figure 28:
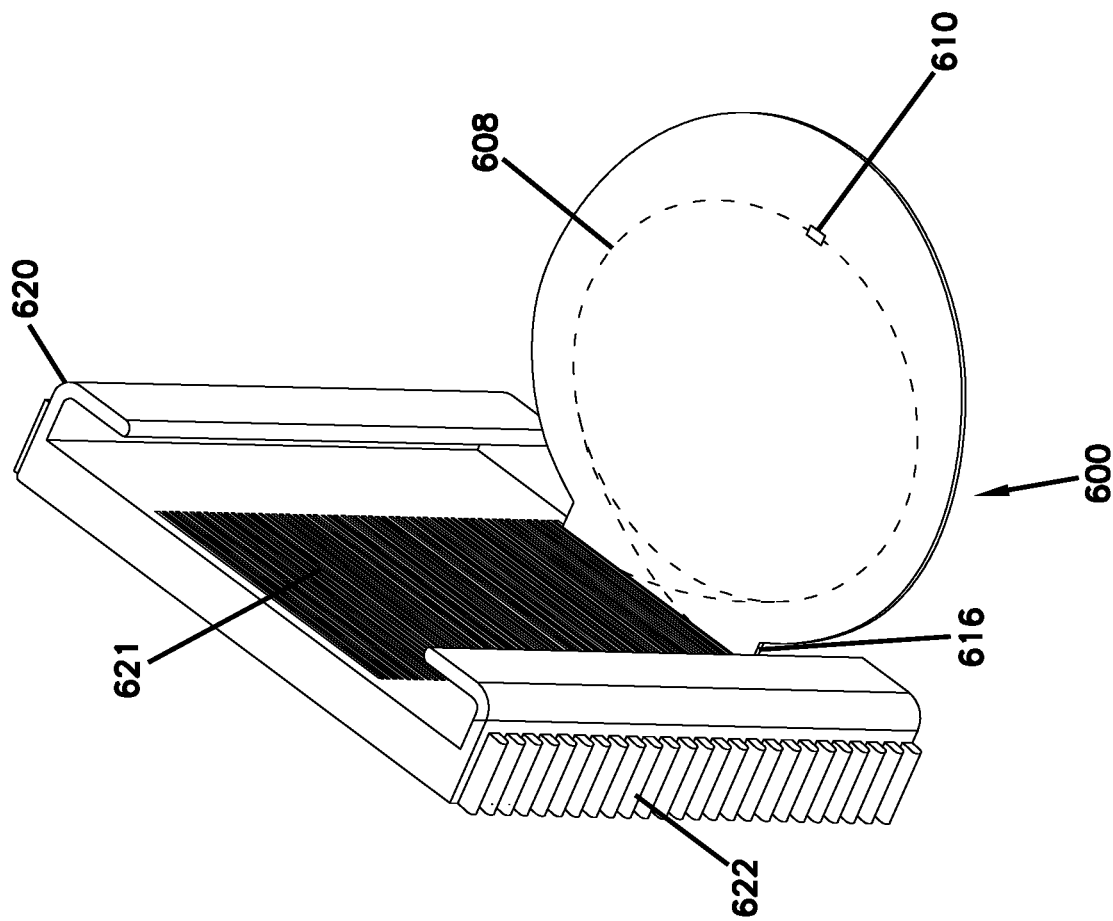
FIG. 28 shows the manager of FIG. 26 integrated with a base component configured for receiving and/or mounting a plurality of the managers.

It will be appreciated that the manager 600 can be used alone or in combination with other structures. In certain examples, a plurality of the managers can be used in combination with a base component that organizes the managers 600 and that guides optical fibers to the managers 600. For example, FIG. 28 shows an example base component 620 adapted to manage a plurality of the managers 600. As shown at FIG. 28, the base component 620 includes a plurality of slots 621 for receiving the connection portions 606 of the manager 600 to secure the managers 600 to the base component 620. The base component 620 also includes fiber routing structures (e.g., channels, slots, etc.) for routing optical fibers to the managers 600 attached to the base component 620, and bend radius limiters 622 for transitioning optical fibers between vertical and horizontal orientations. It will be appreciated that the base components 620 can have a more rigid construction than the managers 600. Thus, the overall management system shown at FIG. 28 includes a combination of both flexible components (e.g., the managers 600) and more rigid components such as the base components 620.

FIG. 29 shows another manager 600a in accordance with the principles of the present disclosure. The manager 600a can have the same construction as the manager 600, except a supplemental connection feature 625 is shown coupled to the substrate 602. Specifically, the connection feature 625 is shown integrated with the connection portion 606 of the substrate 602. In certain examples, the connection feature 625 can be unitarily formed with the substrate 602, adhesively bonded to the substrate 602, thermally bonded to the substrate 602 or otherwise attached to the substrate 602. As depicted, the connection feature 625 is shown as a sleeve such as a snap-fit sleeve that is adapted to snap-fit over a mid-span access location of a fiber optic cable 628. Optical fibers of the fiber loop 608 can be routed from the fiber optic cable 628 to the substrate 602. The connection feature 625 can include an opening 630 for allowing the optical fibers to be routed from the fiber optic cable 628 to the main portion 605 of the substrate 602. While the connection feature 625 is depicted as a sleeve, other connection features can also be used. Example connection features can include rods, pins, projections, hooks, clips, sleeves, clamps, sockets, pin receivers, pivot members, snap-fit members or other structures. In certain examples, the connection features can be more rigid than the main portion 605 of the substrate 602.

Figure 30:
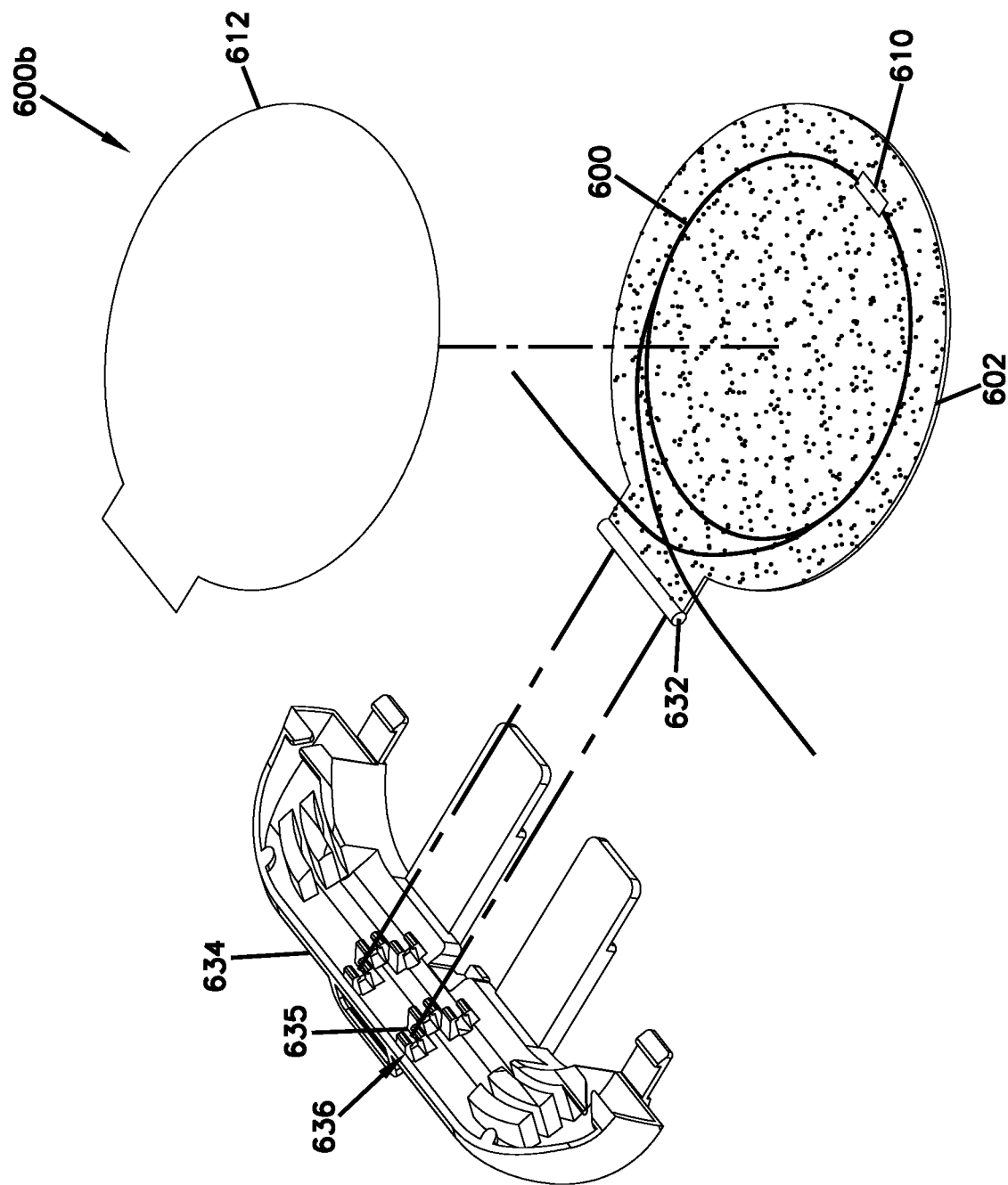
FIG. 30 illustrates a further management system in accordance with the principles of the present disclosure for managing optical fibers and/or optical fiber splices.

FIG. 30 shows another manager 600b in accordance with the principles of the present disclosure. The manager 600b can have the same construction as the manager 600 except a connection feature 632 has been added to the substrate 602. As depicted, connection feature 632 includes a snap-fit member. The snap-fit member can be integrally formed with the substrate 602, adhesively bonded to the substrate 602, thermally bonded to the substrate 602 or otherwise attached to the substrate 602. The snap-fit member 632 can be more rigid than the main portion 605 of the substrate 602. In certain examples, the snap-fit member 632 can be adapted to interface with a base component such as a groove-plate structure 634. The groove-plate structure 634 can be more rigid than the main portion 605 of the manager 600b. The groove-plate structure 634 can include a plurality of channels or grooves for directing optical fibers to a manager mounting location 636. The manager mounting location 636 can include a plurality of manager attachment positions. The manager attachment positions can include couplers 635 for receiving the snap-fit structure 632.

Figure 31:
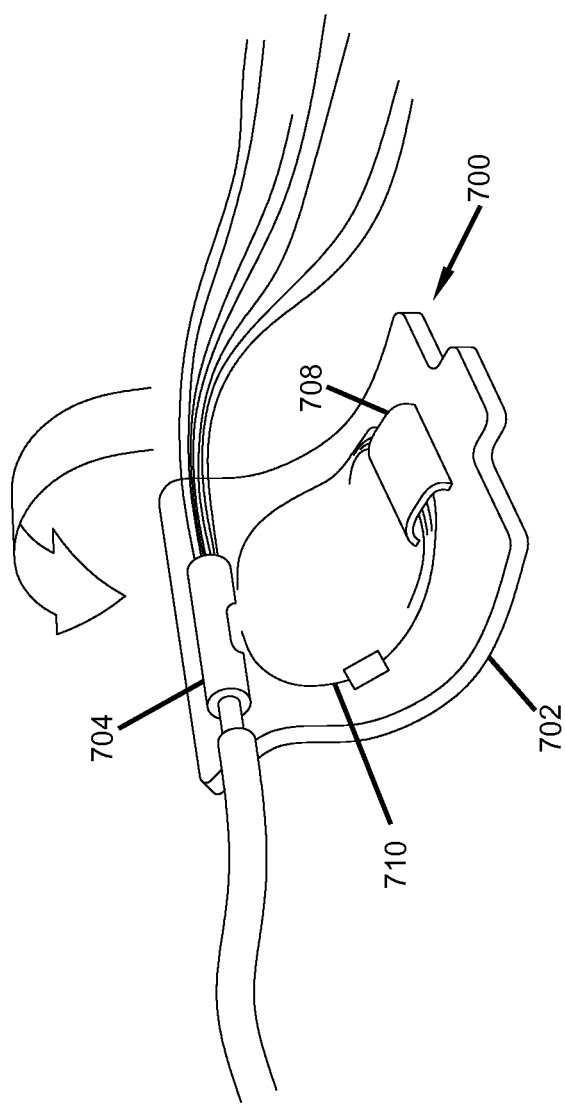
FIG. 31 shows another manager in accordance with the principles of the present disclosure for managing optical fibers and/or optical fiber splices, the manager being shown attached to an optical fiber access location (e.g., a mid-span access location) of a fiber optic cable.
Figure 32:
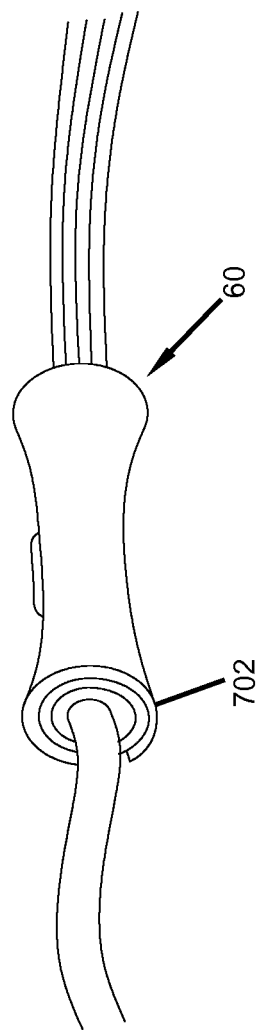
FIG. 32 shows the manager of FIG. 31 arranged in a wrapped configuration in which the manager is wrapped about the fiber optic cable.

FIGS. 31 and 32 show another manager 700 in accordance with the principles of the present disclosure. The manager 700 can include a substrate 702 having a flexibility that allows the substrate 702 to be wrapped into a rolled configuration as shown at FIG. 32. In certain examples, the substrate 702 is a flexible polymeric sheet. In certain examples, the substrate 702 can include one or more attachment features. The attachment features can be integrally formed to a main body of the substrate 702 or mounted to the substrate 702. As depicted, the attachment features can include sleeves, clips or other structures. As depicted, the manager 700 includes a sleeve 704 for attaching substrate 602 to a cable 705. Additionally, the substrate 602 includes an attachment feature in the form of a clip or retainer 708 for securing an optical fiber loop 710 to a main portion 605 of the substrate 702. The fiber loop can include a loop of optical fibers and can also include an optical fiber splice. The optical fiber splice can be protected by a lightweight package of the type described herein or by other means such as a re-coat process. The optical fibers can be routed to the cable through the connection sleeve. To access the optical fiber loop, the substrate can be unrolled. Once the optical fiber is secured on the substrate, the substrate can be wrapped around the fiber optic cable as shown at FIG. 32.

Figure 33:
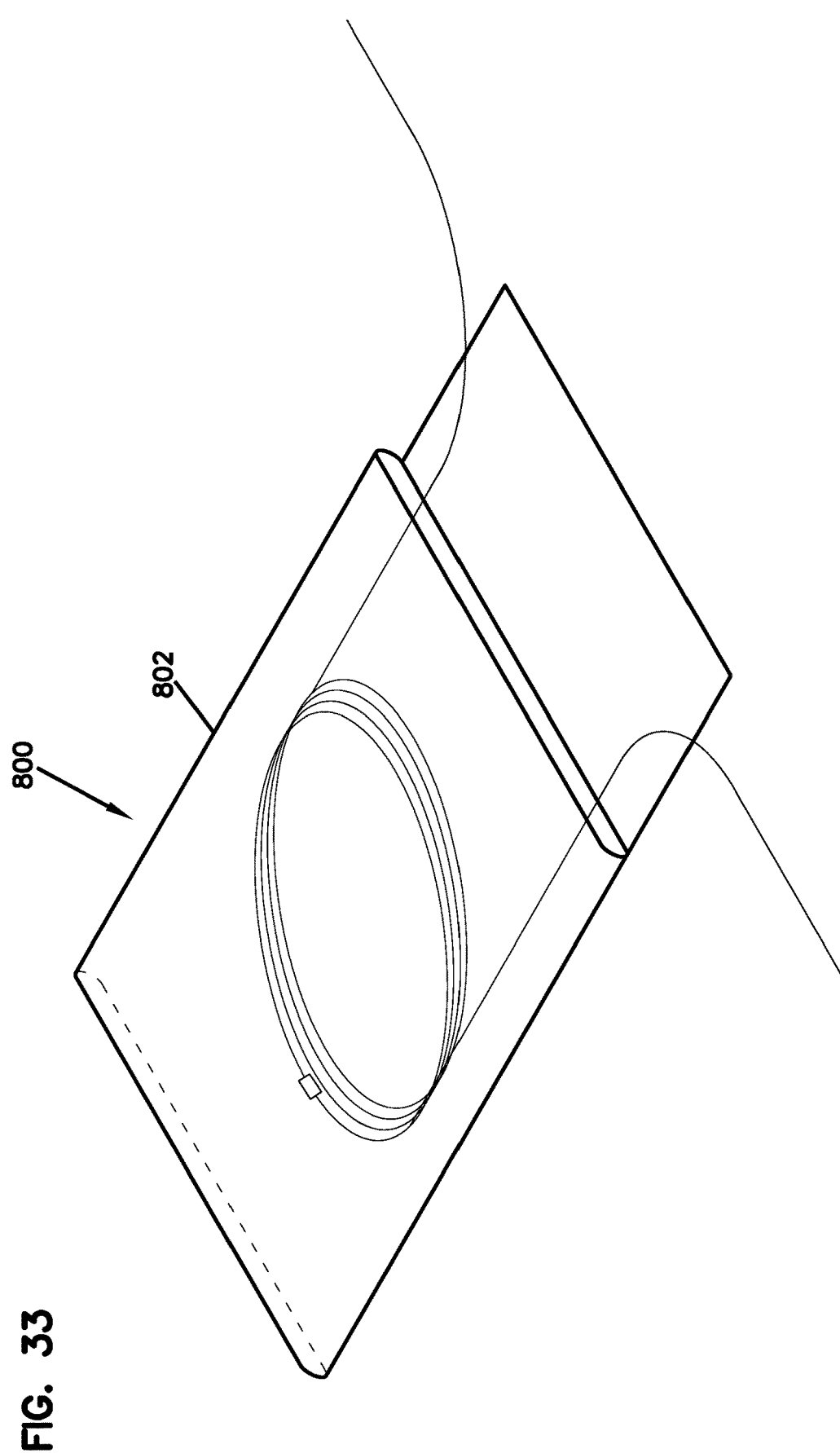
FIG. 33 illustrates a sleeve-style (e.g., envelope style, bag style, etc.) manager in accordance with the principles of the present disclosure for managing optical fibers and/or optical fiber splices.

FIG. 33 shows another manager 800 in accordance with the principles of the present disclosure. The manager 800 includes a flexible substrate 802 in the form of a flexible envelope or sleeve. A fiber loop can be stored within the manager 800. The fiber loop can include an optical splice protected by a lightweight package, a re-coat process or other means. The substrate 802 can be flexible and can be flexed or bent as previously described. Additionally, the manager can be moved between a flat configuration as shown at FIG. 33 and a rolled configuration similar to the rolled configuration of FIG. 32.

Figure 34:
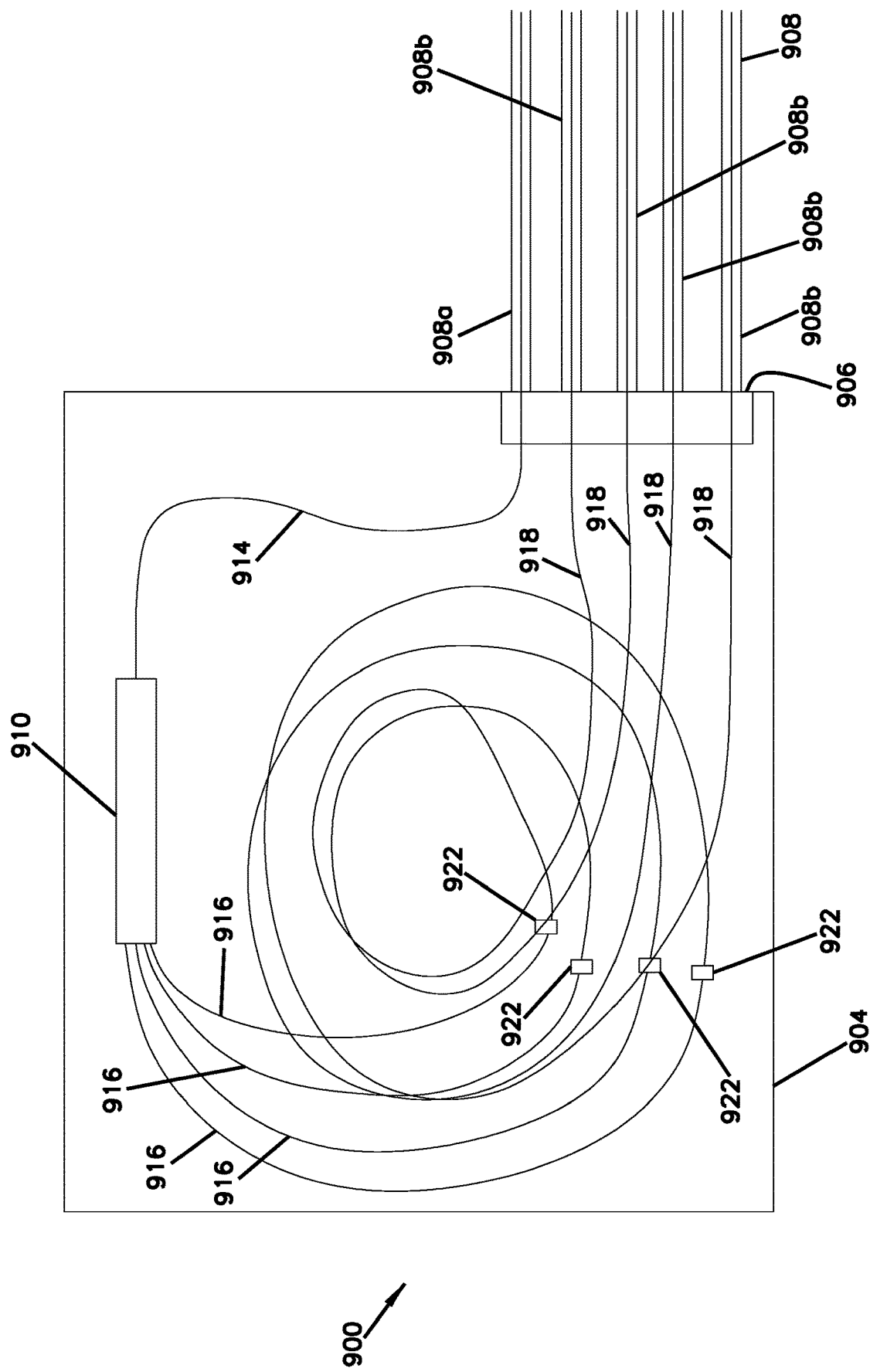
FIG. 34 depicts an optical device (e.g., a passive optical splitter module, a wavelength division multiplexing module, etc.) in accordance with the principles of the present disclosure having splice locations that are not rigidly fixed within the module.
Figure 35:
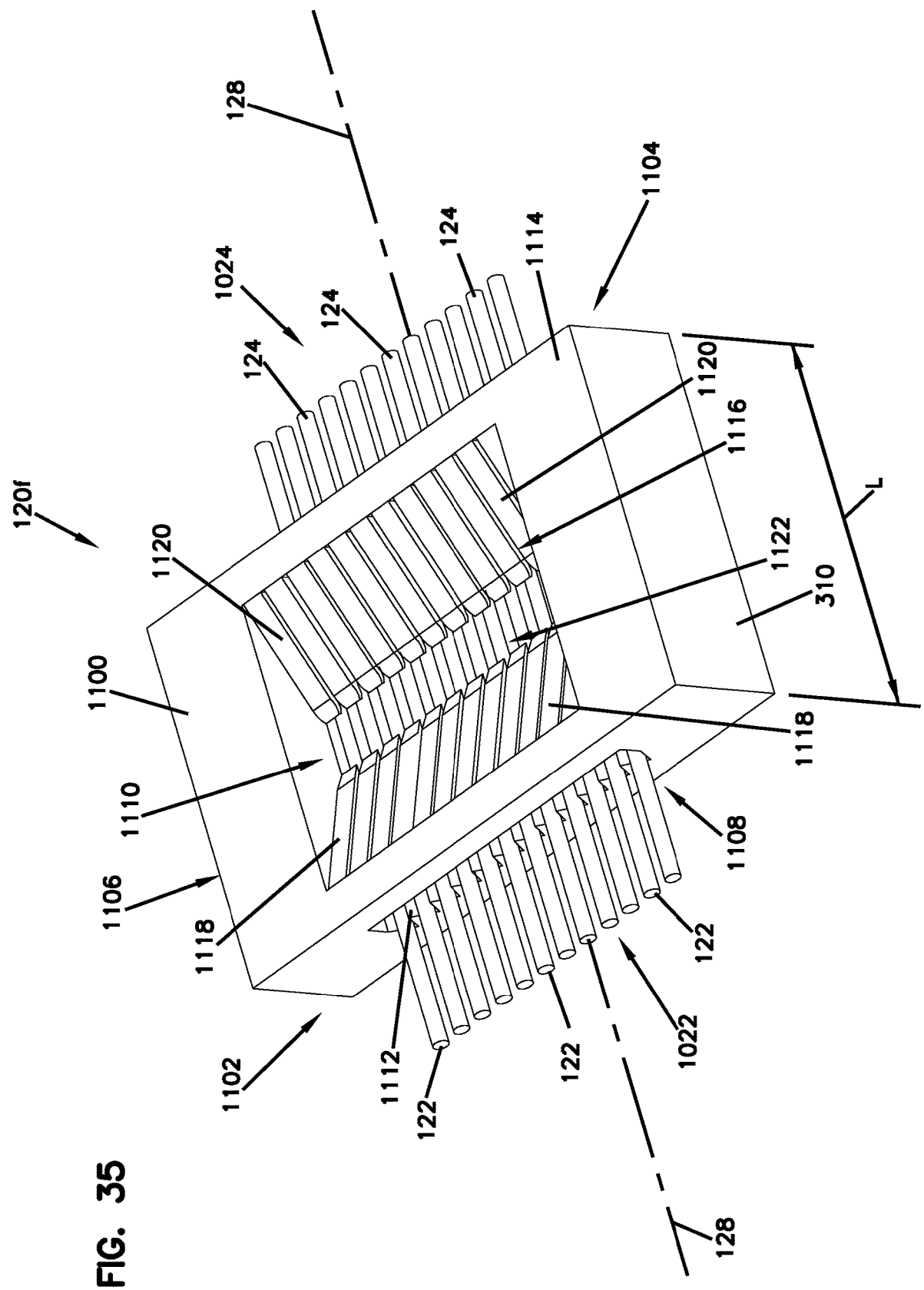
FIG. 35 is a perspective view of a further example splice package in accordance with the present disclosure, the splice package being a multi-fiber splice package shown aligning two sets of optical fibers.

FIG. 34 shows an optical device 900 such as an optical module in accordance with the principles of the present disclosure. The optical device 900 includes a module housing 904 having a fiber entrance/exit location 906. In certain examples, the entrance/exit location 906 can include structure for securing fiber optic cables 908 to the module housing 904. For example, strength/reinforcing elements (e.g., Aramid yarn, other yarn structures, strands, layers, fiberglass structures, rods, or other reinforcing elements) of the fiber optic cables 908 can be anchored to the module housing 904 at the entrance/exit location 906. The optical device 900 can also include an optical component 910 mounted within the module housing 904. Optical component 910 can include a passive optical splitter or a wavelength division multiplexer. An input fiber 914 from an input cable 908a can be optically connected to an input side of the fiber optic component 910. In the case where the optical component is a passive optical splitter, the optical component is configured to passively power split a signal from the input optical fiber 914 to a plurality of output optical fibers 916. In the case of a wavelength division multiplexer, a signal from the input optical fiber 914 is split by the optical component into a plurality of different wavelengths or wavelength bands which are directed to separate output optical fibers 916. The output optical fibers 916 are spliced to optical fibers 918 of output optical cables 908b routed from the module housing 904. The input and the output optical cables 908a, 908b can be anchored to the module housing 904 at the entrance/exit location 906. The splices between the optical fibers 916 and the optical fibers 918 can be protected by a re-coat process or by a lightweight package of the type described herein. The splices 922 can be free-floating within the interior of the module housing 904. Splices can also be randomly positioned within the module housing 904. Additionally, the splices can be positioned along a curvature of fiber storage loops defined by the optical fibers. In certain examples, the module housing 904 does not have a dedicated region for fixating fiber optic splice protectors to the module housing. Instead, the fiber optic splices are positioned free-floating along the optical fiber loops. The module housing 904 may include structure for anchoring the fiber optic component 912 to the module housing 904.

Example Embodiments

According to embodiments of the present disclosure, a splice housing of an optical splice package has a length less than or equal to 10 millimeters, or less than or equal to 7.5 millimeters, or, or less than or equal to 6 millimeters.

According to embodiments of the present disclosure, an optical splice package has a splice housing that is formed as a unitary piece.

According to embodiments of the present disclosure an optical splice package has a splice housing that is a multi-piece assembly.

According to a first embodiment, a splice manager comprises: a fiber loop-storage section for storing excess length of optical fiber in fiber loops; and optical fibers joined at optical fiber splices which are positioned at the fiber loop-storage section.

According to a second embodiment, the splice manager of the first embodiment does not include any structure for fixing splice protectors. According to a third embodiment, the optical fiber splices of the first embodiment are free-floating relative to the fiber loop-storage section.

According to a fourth embodiment, the optical fiber splices of the first embodiment are randomly positioned along the fiber loops.

According to a fifth embodiment, the fiber loop-storage section of the first embodiment is provided on a tray.

According to a sixth embodiment, the fiber loop-storage section of the first embodiment is defined by a flexible structure.

According to seventh embodiment, the flexible structure of the sixth embodiment is a flexible sleeve.

According to an eighth embodiment, the optical fibers of the first embodiment are stored in circular fiber loops.

According to a ninth embodiment, the optical fiber splices of the first embodiment are positioned along the fiber loops.

According to a $10^{th}$ embodiment is provided an optical splice package for splicing together first and second optical fibers, the optical fibers having elastic bending characteristics, the optical splice package comprising: a splice housing including a mechanical alignment feature for co-axially aligning ends of the first and second optical fibers within the splice housing, the splice housing containing adhesive for securing the ends of the first and second optical fibers within the splice housing, the optical package having a weight less than a spring force generated by the inherent elastic bending characteristics of the spliced optical fibers when the spliced optical fibers are bent at their minimum bend radius.

According to an $11^{th}$ embodiment is provided a fiber optic connector comprising: a connector housing including a front end; a ferrule positioned at the front end of the connector housing; an optical fiber supported by the ferrule, the optical fiber having a stub that extends rearwardly from the ferrule; a cable fiber spliced to the stub at a splice location within the connector housing, the splice location being protected by a splice package including a splice housing, a mechanical fiber alignment feature within the splice housing, and adhesive for securing the stub and the cable fiber within the splice housing, the splice package being free-floating within the connector housing.

According to a $12^{th}$ embodiment is provided a splice tray comprising: a tray body defining first and second separate fiber loop storage regions, wherein the splice tray does not include a dedicated region for fixing fiber optic splice protectors to the tray body.

According to a $13^{th}$ embodiment is provided the splice tray of the $12^{th}$ embodiment, wherein each of the fiber loop storage regions includes a spool-structure about which optical fibers can be looped.

According to a $14^{th}$ embodiment is provided the splice tray of the $13^{th}$ embodiment, wherein each of the fiber loop storage regions includes a fiber containment structure that at least partially surrounds the spool structure.

According to a $15^{th}$ embodiment is provided the splice tray of the $12^{th}$, $13^{th}$ or $14^{th}$ embodiment, wherein the tray body defines separate fiber entrance/exit locations corresponding to each of the separate fiber loop storage regions.

According to a $16^{th}$ embodiment is provided the splice tray of the $12^{th}$, $13^{th}$, $14^{th}$, or $15^{th}$ embodiment, wherein the tray body defines a connection passage for routing optical fibers between the separate fiber loop storage regions.

According to a $17^{th}$ embodiment is provided the splice tray of the $12^{th}$, $13^{th}$, $14^{th}$ $15^{th}$, or $16^{th}$ embodiment, wherein optical fiber loops are stored within the fiber loop storage regions, and wherein the fiber loops include optical splices.

According to an $18^{th}$ embodiment is provided the splice tray of the $17^{th}$ embodiment, wherein the fiber loops are circular, and wherein the splices are positioned along the circular fiber loops.

According to a $19^{th}$ embodiment is provided the splice tray of any of the $12^{th}$-$18^{th}$ embodiments, wherein the splice tray is adapted to pivotally connect to a base defining fiber routing paths.

According to a $20^{th}$ embodiment is provided the splice tray of any of the $12^{th}$-$19^{th}$ embodiments, wherein the splice tray can support a splice density of at least 1 splice per 10 or 8 or 6 square centimeters of foot print area of the tray body.

According to a $21^{st}$ embodiment is provided a fiber optic device comprising: a housing; fiber optic cables routed from the housing; optical fibers spliced to optical fibers of the fiber optic cables at splice locations within the housing, the splice locations being free-floating within the connector housing.

According to a $22^{nd}$ embodiment is provided the fiber optic device of the $21^{st}$ embodiment, wherein the optical fibers are stored in fiber loops within the housing, and wherein the splice locations are positioned along bent portions of fiber loops.

According to a $23^{rd}$ embodiment is provided the fiber optic device of the $21^{st}$ or $22^{nd}$ embodiment, wherein the splice locations include re-coated splices or splices protected by light-weight splice packages.

According to a $24^{th}$ embodiment is provided the fiber optic device of any of the $21^{st}$-$23^{rd}$ embodiments, wherein the device does not include a dedicated region for fixing optical splices relative to the housing.

According to a $25^{th}$ embodiment is provided the fiber optic device of any of $21^{st}$-$24^{th}$ embodiments, wherein the housing contains a fiber optic component such as a passive optical power splitter or a wavelength division multiplexer.

According to a 26th embodiment is provided a fiber management device comprising: a base having substrate attachment locations; and fiber management substrates that attach to the substrate attachment locations of the base, the fiber management substrates having flexible constructions that allow the substrates to flex through a range of movement relative to the base that includes at least 45 degrees.

According to a 27th embodiment is provided the fiber management device of the 26th embodiment, wherein the base is more rigid than the fiber management substrates.

According to a 28th embodiment is provided an optical fiber management system comprising: a flexible substrate for managing an optical fiber.

According to a 29th embodiment is provided the optical fiber management system of the 28th embodiment, wherein the optical fiber includes a fiber loop and an optical splice managed on the substrate.

According to a 30th embodiment is provided the optical fiber management system of any of the 28th-29th embodiments, wherein the substrate has inherent flexibility that allows the substrate to be flexed like a living hinge.

According to a 31st embodiment is provided the optical fiber management system of any of the 28th-30th embodiments, wherein the substrate includes a flexible sheet, a flexible sleeve, a flexible envelope or a flexible bag.

According to a 32nd embodiment is provided the optical fiber management system of any of the 28th-31st embodiments, wherein the substrate includes a flexible polymeric sheet.

According to a 33rd embodiment is provided the optical fiber management system of any of the 28th-32nd embodiments, wherein the substrate includes a bottom substrate layer and an adhesive layer is provided on the bottom substrate layer for holding the optical fiber on the bottom substrate layer.

According to a 34th embodiment is provided the optical fiber management system of the 33rd embodiment, wherein the substrate includes a top substrate layer that affixes to the bottom layer via the adhesive with the routed optical fiber secured between the top and bottom substrate layers.

According to a 35th embodiment is provided the optical fiber management system of the 34th embodiment, wherein the adhesive is a pressure sensitive adhesive having a bond strength strong enough to hold the bottom and top substrate layers together during storage of the optical fiber, and weak enough to allow the bottom and top substrate layers to be pulled apart to allow the routed optical fiber to be accessed.

According to a 36th embodiment is provided the optical fiber management system of any of the 28th-35th embodiments, wherein the optical fiber can include excess fiber length that is stored for use in later optical splicing, or the routed optical fiber can include fibers that have been spliced together where the substrate assists in storing/managing the optical fibers and in protecting the splice location.

According to a 37th embodiment is provided the optical fiber management system of any of the 28th-36th embodiments, wherein the system includes a plurality of the flexible substrates that attach to a base.

According to a 38th embodiment is provided the optical fiber management system of the 37th embodiment, wherein the base defines a plurality of substrate mounting locations for mounting the substrates in a stacked/overlapping configuration.

According to a 39th embodiment is provided the optical fiber management system of the 38th embodiment, wherein the substrates have flexible constructions that provide the substrates with inherent flexibility that allows the substrates to flex/pivot in a living hinge manner at least 45, 90, 135, or 180 degrees relative to the base to allow the substrates to be individually accessed.

According to a 40th embodiment is provided the optical fiber management system of any of the 37th-39th embodiments, wherein the substrates include tabs that interface with the base.

According to a 41st embodiment is provided the optical fiber management system of any of the 37th-40th embodiments wherein the base includes a groove plate having grooves for routing optical fibers to different spaced-apart substrate mounting locations.

According to a 42nd embodiment is provided the optical fiber management system of any of the 28th-41st embodiments, wherein the flexible substrate includes a connection feature.

According to a 43rd embodiment is provided the optical fiber management system of the 42nd embodiment, wherein the connection feature includes a rod, a pin, a projection, a tab, a hook, a clip, a sleeve, a clamp, a socket, a pivot receiver, a pivot member, a lip, a retainer or a snap-fit member.

According to a 44th embodiment is provided an optical splice package for splicing together first and second sets of optical fibers, the optical fibers having elastic bending characteristics, the optical splice package comprising: a splice housing including a mechanical alignment feature for co-axially aligning ends of the first and second sets of optical fibers within the splice housing, the splice housing containing adhesive for securing the ends of the first and second sets of optical fibers within the splice housing, the optical splice package having a weight less than a combined spring force generated by the inherent elastic bending characteristics of the spliced optical fibers of the first and second sets when the spliced optical fibers are bent at their minimum bend radius.

According to a 45th embodiment is provided an optical fiber management system comprising: a flexible substrate for managing a set of optical fibers of a multi-fiber optical cable.

According to a 46th embodiment is provided the optical fiber management system of the 45th embodiment, wherein the set of optical fibers includes a loop and a multi-fiber optical splice managed on the substrate.

According to a 47th embodiment is provided the optical fiber management system of any of the 45th or 46th embodiments, wherein the substrate has inherent flexibility that allows the substrate to be flexed like a living hinge.

According to a 48th embodiment is provided the optical fiber management system of any of the 45th-47th embodiments, wherein the substrate includes a flexible sheet, a flexible sleeve, a flexible envelope or a flexible bag.

According to a 49th embodiment is provided the optical fiber management system of any of the 45th-48th embodiments, wherein the substrate includes a flexible polymeric sheet.

According to a 50th embodiment is provided the optical fiber management system of any of the 45th-49th embodiments, wherein the substrate includes a bottom substrate layer and an adhesive layer is provided on the bottom substrate layer for holding the set of optical fibers on the bottom substrate layer.

According to a 51st embodiment is provided the optical fiber management system of any of the 45th-50th embodiments, wherein the substrate includes a top substrate layer that affixes to the bottom layer via the adhesive with the routed set of optical fiber secured between the top and bottom substrate layers.

According to a 52$^{nd}$ embodiment is provided the optical fiber management system of the 51$^{st}$ embodiment, wherein the adhesive is a pressure sensitive adhesive having a bond strength strong enough to hold the bottom and top substrate layers together during storage of the set of optical fibers, and weak enough to allow the bottom and top substrate layers to be pulled apart to allow the routed set of optical fibers to be accessed.

According to a 53$^{rd}$ embodiment is provided the optical fiber management system of any of the 45$^{th}$-52$^{nd}$ embodiments, wherein each of the set of optical fibers can include excess fiber length that is stored for use in later optical splicing, or the routed set of optical fibers can include fibers that have been spliced together where the substrate assists in storing/managing the optical fibers and in protecting the splice location.

According to a 54$^{th}$ embodiment is provided the optical fiber management system of any of the 45$^{th}$-53$^{rd}$ embodiments, wherein the system includes a plurality of the flexible substrates that attach to a base.

According to a 55$^{th}$ embodiment is provided the optical fiber management system of the 54$^{th}$ embodiment, wherein the base defines a plurality of substrate mounting locations for mounting the substrates in a stacked/overlapping configuration.

According to a 56$^{th}$ embodiment is provided the optical fiber management system of the 55$^{th}$ embodiment, wherein the substrates have flexible constructions that provide the substrates with inherent flexibility that allows the substrates to flex/pivot in a living hinge manner at least 45, 90, 135, or 180 degrees relative to the base to allow the substrates to be individually accessed.

According to a 57$^{th}$ embodiment is provided the optical fiber management system of any of the 54$^{th}$-56$^{th}$ embodiments, wherein the substrates include tabs that interface with the base.

According to a 58$^{th}$ embodiment is provided the optical fiber management system of any of the 54$^{th}$-57$^{th}$ embodiments, wherein the base includes a groove plate having grooves for routing optical fibers to different spaced-apart substrate mounting locations.

According to a 59$^{th}$ embodiment is provided the optical fiber management system of any of the 45$^{th}$-58$^{th}$ embodiments, wherein the flexible substrate includes a connection feature.

According to a 60$^{th}$ embodiment is provided the optical fiber management system of the 59$^{th}$ embodiment, wherein the connection feature includes a rod, a pin, a projection, a tab, a hook, a clip, a sleeve, a clamp, a socket, a pivot receiver, a pivot member, a lip, a retainer or a snap-fit member.

According to a 61$^{st}$ embodiment is provided an optical splice package for splicing together first and second sets of optical fibers, the optical fibers having elastic bending characteristics, the optical splice package comprising: a splice housing including a mechanical alignment feature for co-axially aligning ends of the first and second sets of optical fibers within the splice housing, the splice housing containing adhesive for securing the ends of the first and second sets of optical fibers within the splice housing, the optical splice package having a weight less than a spring force corresponding to the combined elastic bending characteristics of at least one optical fiber of each of the first and second sets.

According to a 62$^{nd}$ embodiment is provided the optical splice package of the 61$^{st}$ embodiment, wherein the optical splice package has a weight less than a spring force corresponding to the combined elastic bending characteristics of at least two optical fibers of each of the first and second sets.

According to a 63$^{rd}$ embodiment is provided the optical splice of the 62$^{nd}$ embodiment, wherein the optical splice package has a weight less than a spring force corresponding to the combined elastic bending characteristics of at least two but fewer than all of the optical fibers of each of the first and second sets.

According to a 64$^{th}$ embodiment is provided an optical splice package for splicing together first and second sets of optical fibers, the optical fibers having elastic bending characteristics, the optical splice package comprising: a splice housing including a mechanical alignment feature for co-axially aligning ends of the first and second sets of optical fibers within the splice housing, the splice housing containing adhesive for securing the ends of the first and second sets of optical fibers within the splice housing, the optical splice package having a weight less than a combined spring force generated by the inherent elastic bending characteristics of at least a first of the spliced optical fibers of the first and second sets when the first of the spliced optical fibers are at their minimum bend radius.

According to a 65$^{th}$ embodiment is provided the optical splice package of the 64$^{th}$ embodiment, wherein the optical splice package has a weight less than a combined spring force generated by the inherent elastic bending characteristics of at least a first and a second of the spliced optical fibers of the first and second sets when the first and second of the spliced optical fibers are at their minimum bend radius.

According to a 66$^{th}$ embodiment is provided the optical splice package of the 65$^{th}$ embodiment, wherein the optical splice package has a weight less than a combined spring force generated by the inherent elastic bending characteristics of at least a first and a second but fewer than all of the spliced optical fibers of the first and second sets when at least the first and second of the spliced optical fibers are at their minimum bend radius.

According to a 67$^{th}$ embodiment is provided a mechanical alignment package having a housing and comprising: an internal fiber alignment structure disposed in the housing; first and second optical fibers having ends that are co-axially aligned within the housing by the internal fiber alignment structure; an index matching gel within the housing and between opposing ends of the first and second optical fibers; and adhesive within the housing on opposite sides of the gel for retaining the first and second optical fibers within the housing.

What is claimed is:

1. An optical splice package, comprising:
 a splice housing including a mechanical alignment feature for co-axially aligning ends of first and second sets of optical fibers within the splice housing, the optical splice package having a weight that is less than a spring force corresponding to combined elastic bending characteristics of at least two but fewer than all of the optical fibers of each of the first and second sets of optical fibers, the splice housing having a length less than or equal to 5 millimeters.

2. The optical splice package of claim 1, wherein the splice housing is free-floating such that no exterior surface of the splice housing is fixated to another structure.

3. The optical splice package of claim 1, including an adhesive within the splice housing that fixes the ends of the first and second sets of optical fibers.

4. The optical splice package of claim 1, including an index matching gel between the ends of the first and second sets of optical fibers.

5. The optical splice package of claim 4, including an adhesive on opposite sides of the gel for retaining the first and second sets of optical fibers in place.

6. The optical splice page of claim 1, wherein the splice package has a weight less than 18 milligrams.

7. The optical splice package of claim 1, wherein the mechanical alignment feature includes a cantilever.

8. The optical splice package of claim 1, wherein the mechanical alignment feature includes a groove defined by the splice housing.

9. The optical splice package of claim 8, wherein the groove is V-shaped.

10. The optical splice package of claim 1, wherein the optical splice package is configured to be assembled as a single unit.

11. The optical splice package of claim 1, wherein the optical splice package is configured to be assembled as a multi-piece assembly.

12. The optical splice package of claim 1, wherein the first and second sets of optical fibers are positioned in a splice tray and the splice housing is not fixated to the splice tray.

13. The optical splice package of claim 1, wherein the first and second sets of optical fibers are positioned in a connector housing and the splice package is not fixated to the connector housing.

14. The optical splice package of claim 1, wherein the first and second sets of optical fibers are positioned in a module housing and the splice package is not fixated to the module housing.

* * * * *